(12) United States Patent  
Ueno et al.

(10) Patent No.: US 8,369,632 B2  
(45) Date of Patent: Feb. 5, 2013

(54) IMAGE PROCESSING APPARATUS AND IMAGING APPARATUS

(75) Inventors: Akira Ueno, Hachioji (JP); Keisuke Nakazono, Hino (JP); Yoshinobu Tanaka, Hachioji (JP)

(73) Assignee: Olympus Corporation, Tokyo (JP)

( * ) Notice: Subject to any disclaimer, the term of this patent is extended or adjusted under 35 U.S.C. 154(b) by 497 days.

(21) Appl. No.: 12/725,300

(22) Filed: Mar. 16, 2010

(65) Prior Publication Data

US 2010/0260428 A1    Oct. 14, 2010

(30) Foreign Application Priority Data

Apr. 8, 2009 (JP) ................................ 2009-094179
May 8, 2009 (JP) ................................ 2009-113615
May 26, 2009 (JP) ................................ 2009-126547

(51) Int. Cl.
*G06K 9/36* (2006.01)
(52) U.S. Cl. ........ 382/232; 382/233; 382/236; 382/250; 382/251
(58) Field of Classification Search .............. 382/232, 382/233, 236, 238, 239, 240, 248, 250, 251, 382/305; 375/240.01, 240.25; 348/699, 348/384.1; 708/203, 525; 345/502, 555
See application file for complete search history.

(56) References Cited

U.S. PATENT DOCUMENTS

| 5,448,310 | A * | 9/1995 | Kopet et al. ................ 348/699 |
| 6,553,143 | B2 * | 4/2003 | Miyake et al. .............. 382/239 |
| 6,961,084 | B1 * | 11/2005 | Duncan et al. ............ 348/222.1 |

FOREIGN PATENT DOCUMENTS

| JP | 2000-312308 | 11/2000 |
| JP | 2000-312327 | 11/2000 |
| JP | 2000-354168 | 12/2000 |
| JP | 2002-304624 | 10/2002 |
| JP | 2003-219185 | 7/2003 |
| JP | 2006-262449 | 9/2006 |
| JP | 2007-36596 | 2/2007 |
| JP | 2009-284094 | 12/2009 |

OTHER PUBLICATIONS

First Office Action for Japanese Patent Application No. 2009-126547, mailed Nov. 13, 2012 (5 pgs.) with translation (7 pgs.).
First Office Action for Japanese Patent Application No. 2009-094179, mailed Nov. 27, 2012 (3 pgs.) with translation (4 pgs.).

* cited by examiner

*Primary Examiner* — Ali Bayat
(74) *Attorney, Agent, or Firm* — John C. Pokotylo; Straub & Pokotylo

(57) ABSTRACT

An image processing apparatus includes image processors and a margin storing buffer. The image processors read an input image data from a frame memory for each image data of a plurality of block lines each having a first number of pixels along the columns and a second number of pixels along the rows. The margin storing buffer stores the image data of the margin portion used also in the image processing of the image data of the next block line, among the image data of the present block line input to each of the image processors. Each of the image processors performs the image processing on an image data including the image data of the present block line and the image data of the margin portion, at the time of image processing on the image data of the next block line.

27 Claims, 27 Drawing Sheets

Restart marker interval of 1

One compression unit

Restart marker interval of 2

One compression unit

Restart marker interval of 4

One compression unit

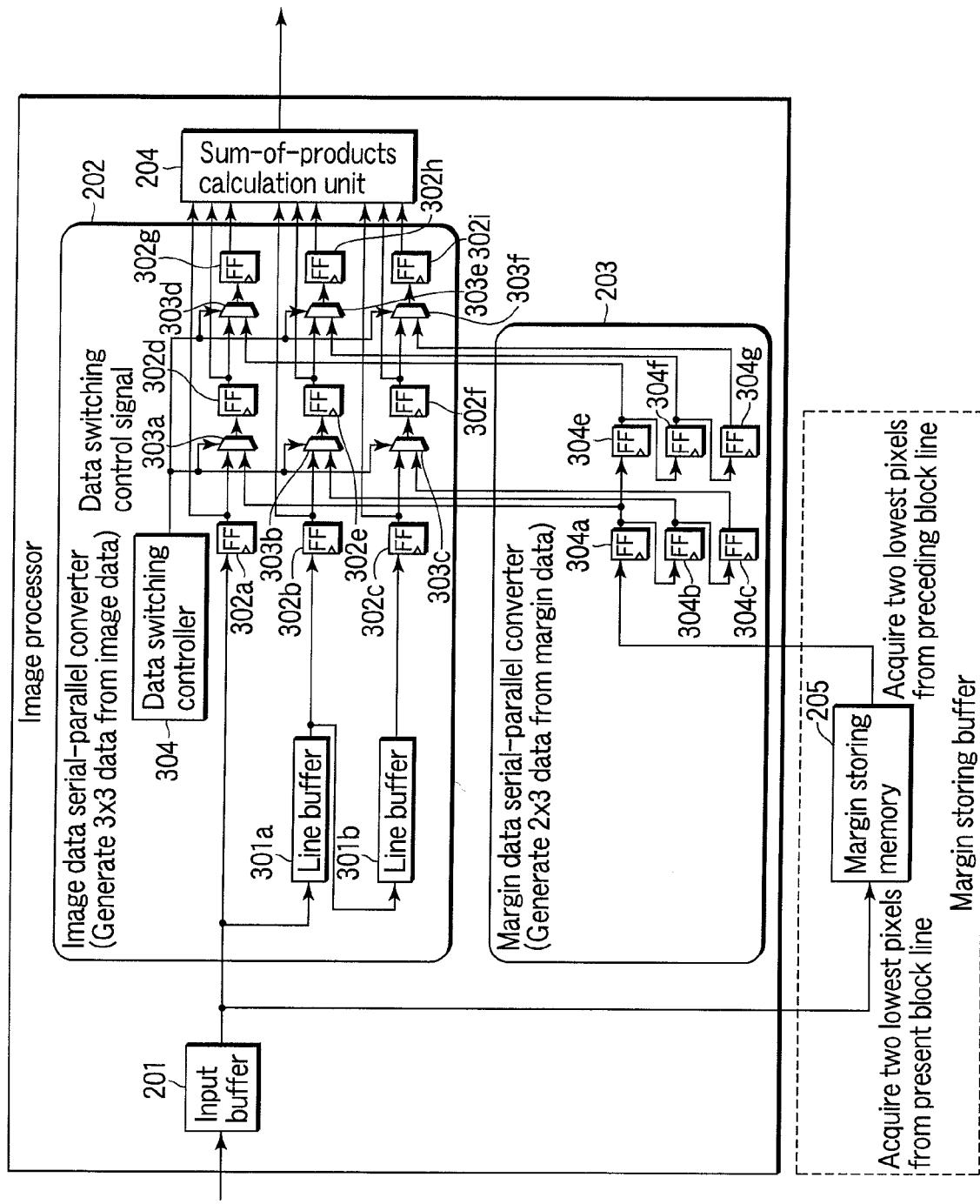
F I G. 5

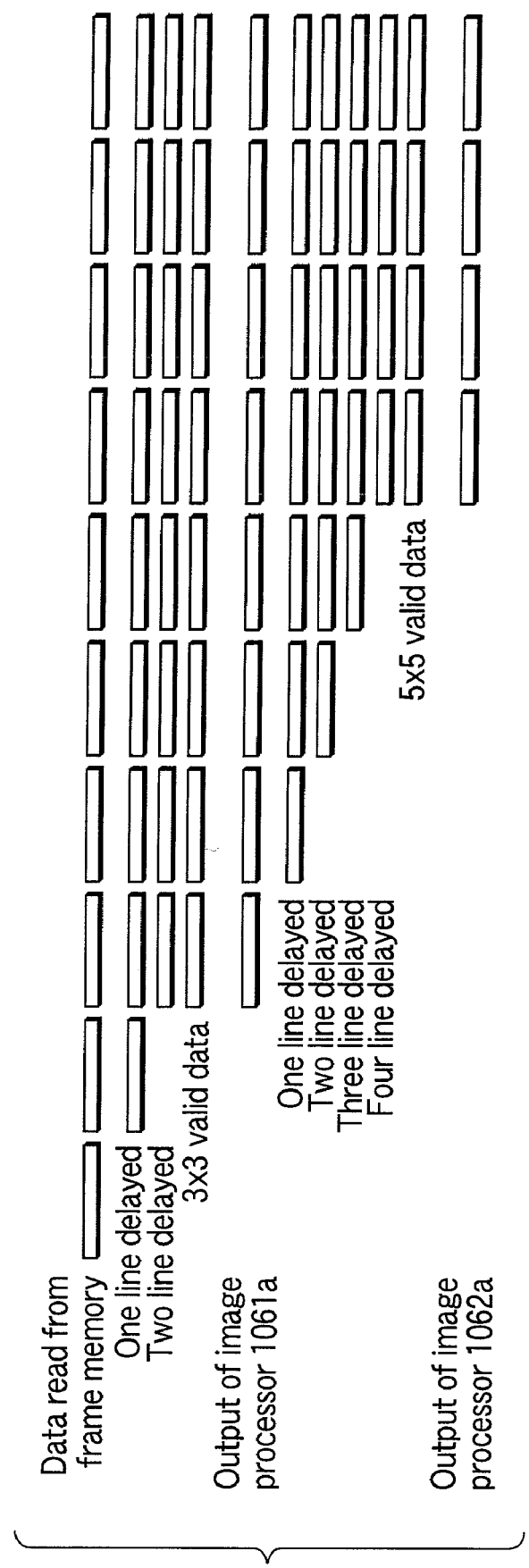
F I G. 8

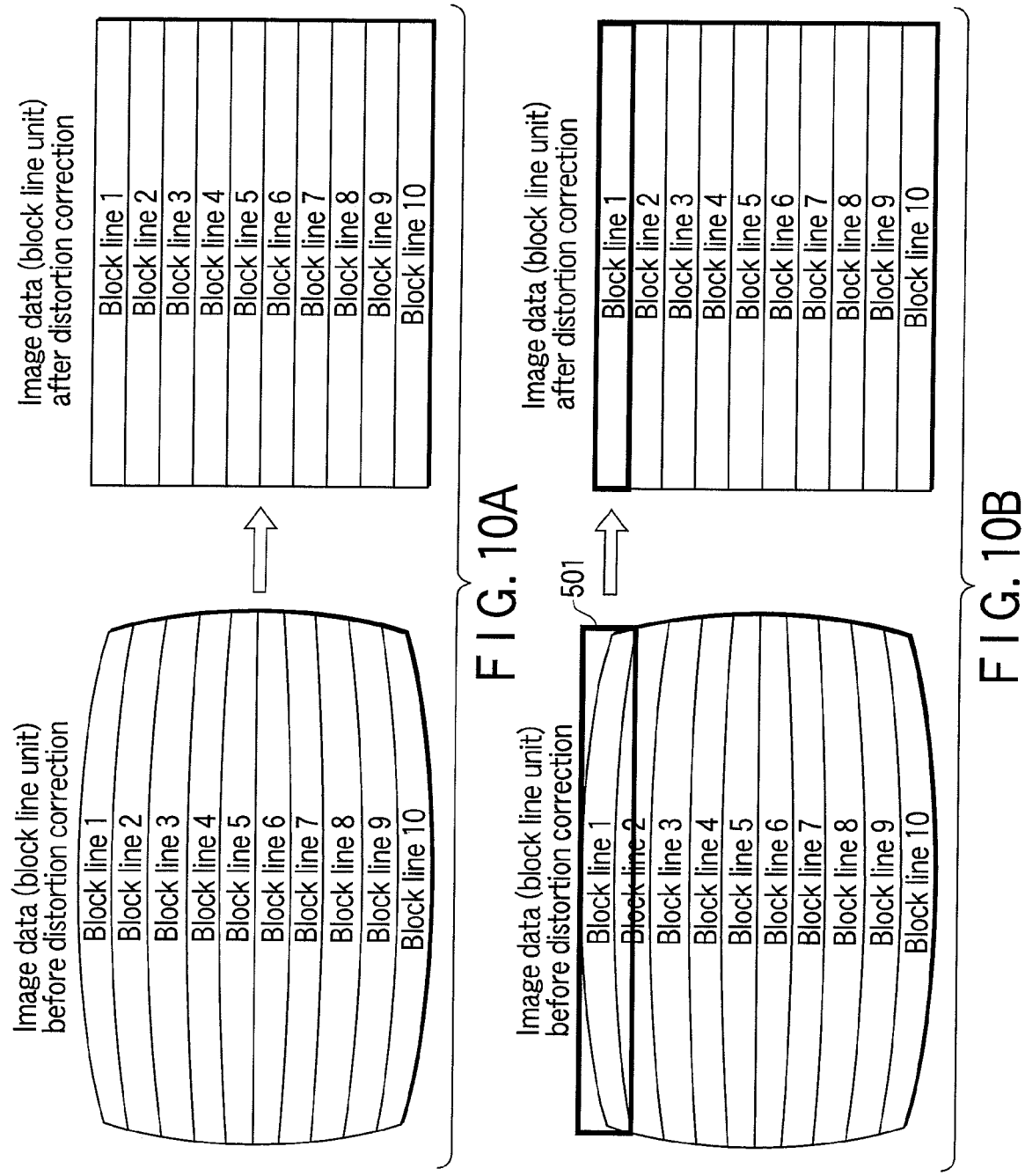

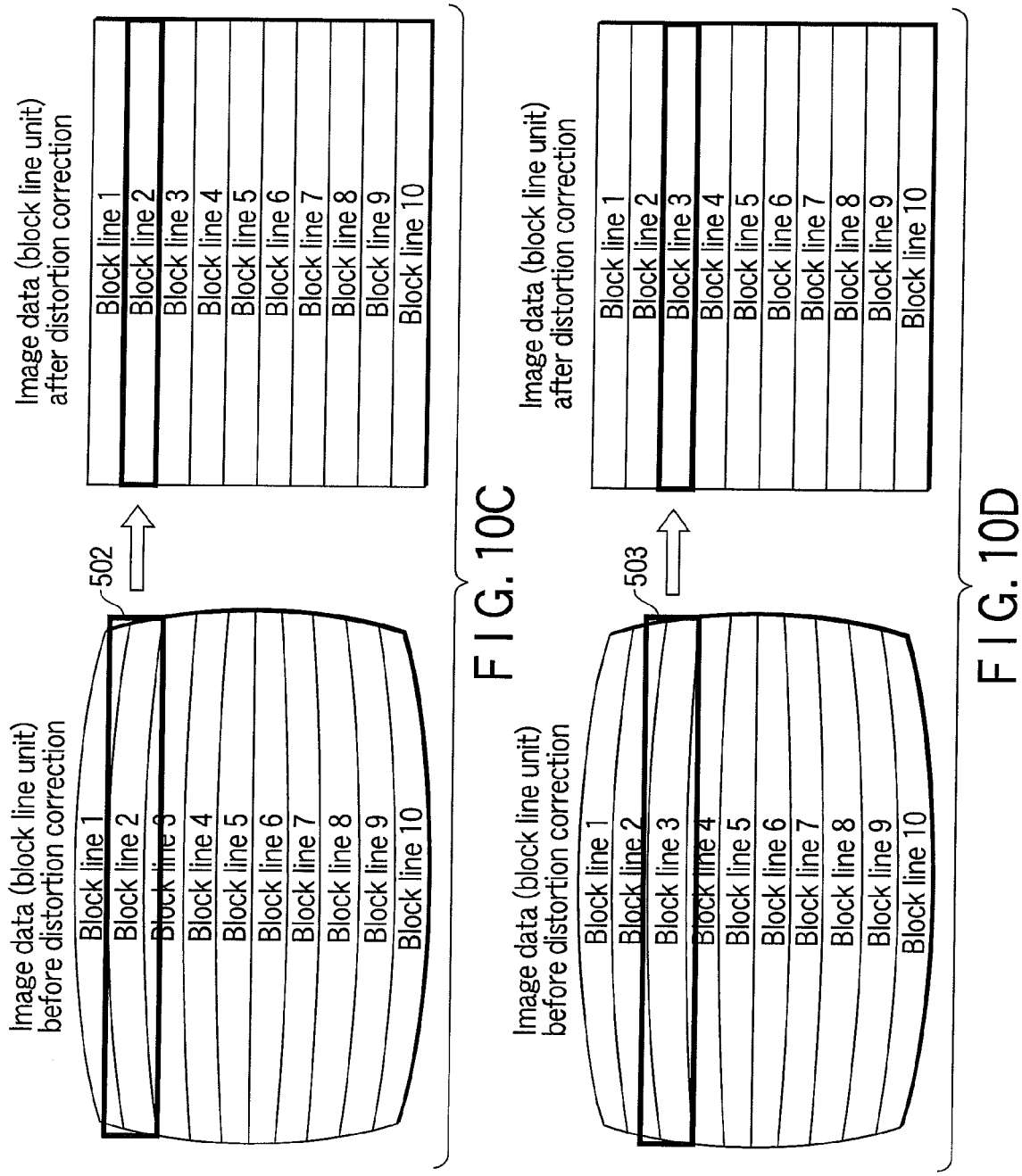

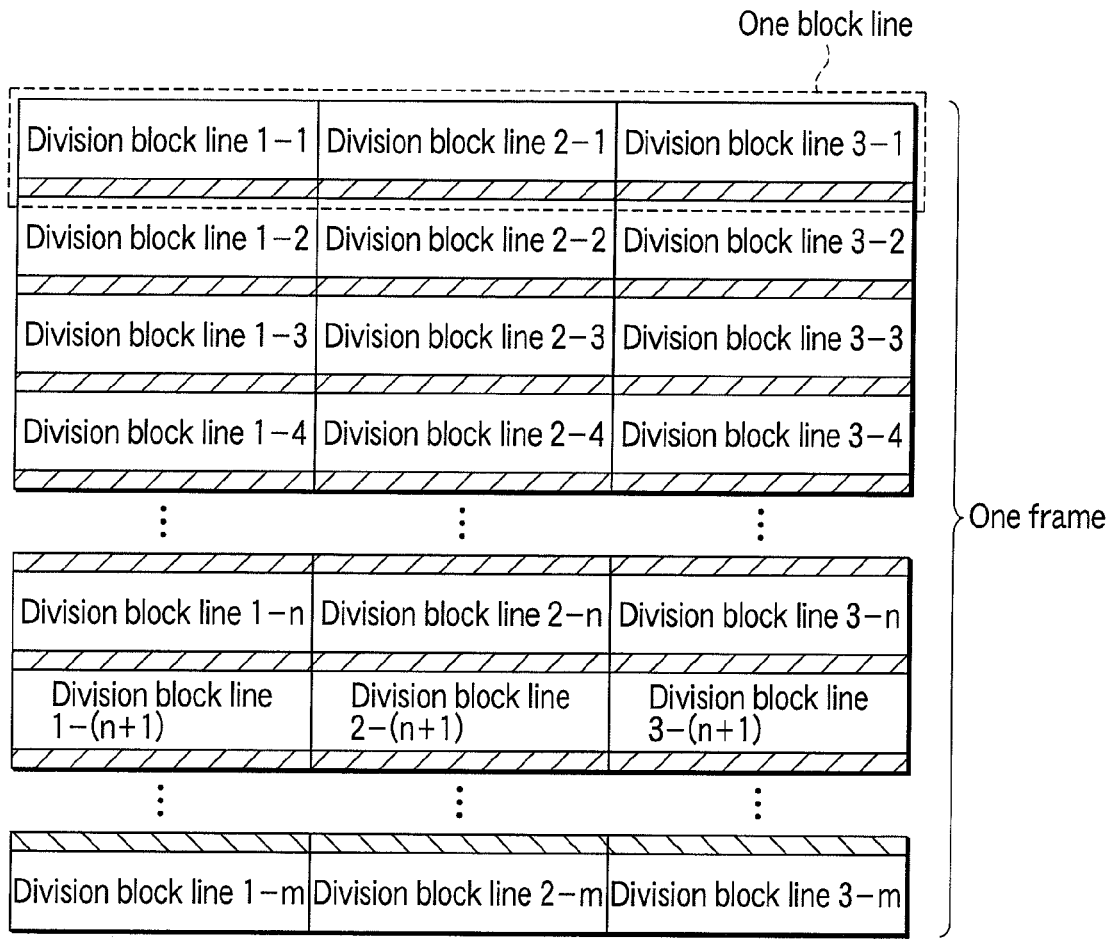
F I G. 11A
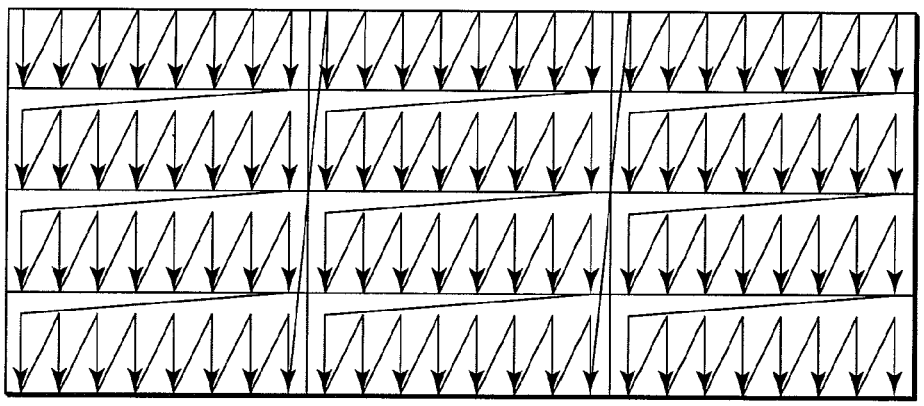
F I G. 11B

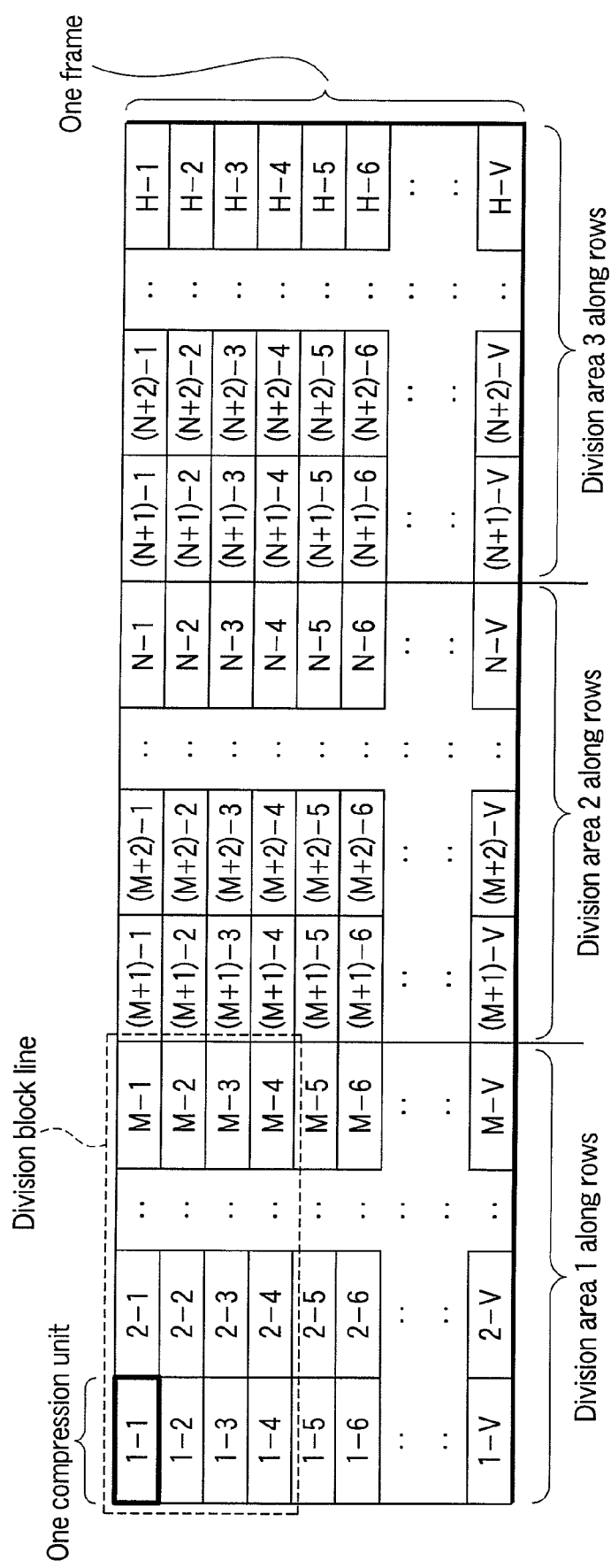
F I G. 13A

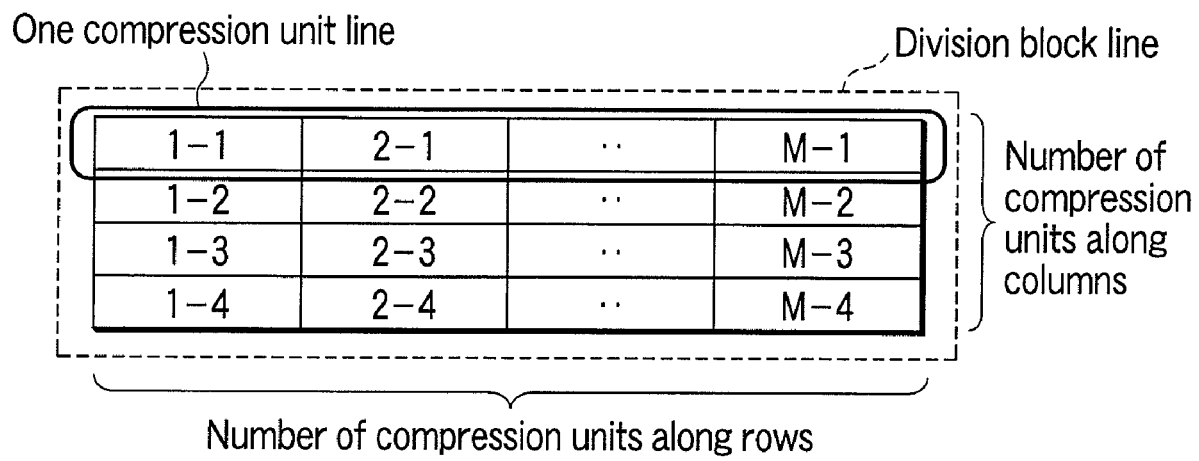
F I G. 16

| | Image processor 1061a | Image processor 1062a | Image processor 1063a | Image processor 1064a | Total margin |
|---|---|---|---|---|---|
| Normal imaging | Margin A for Bayer → YC processing | Margin B for normal noise removing process | OFF | OFF | Total margin: A + B |
| High-sensitivity imaging | Margin A for Bayer → YC processing | Margin B' for strong noise removing process | OFF | OFF | Total margin: A + B' |
| Reduction recording | Margin A for Bayer → YC processing | Margin B for normal noise removing process | Margin C for LPF process | Margin D for reduction process | Total margin: A + B + C + D |
| Imaging with distortion correction | Margin A for Bayer → YC processing | Margin B for normal noise removing process | OFF | Margin E for distortion correction | Total margin: A + B + E |
| Maximum margin amount | Margin A | Margin B' | Margin C | Margin E | Total maximum margin: A + B' + C + E |

F I G. 23

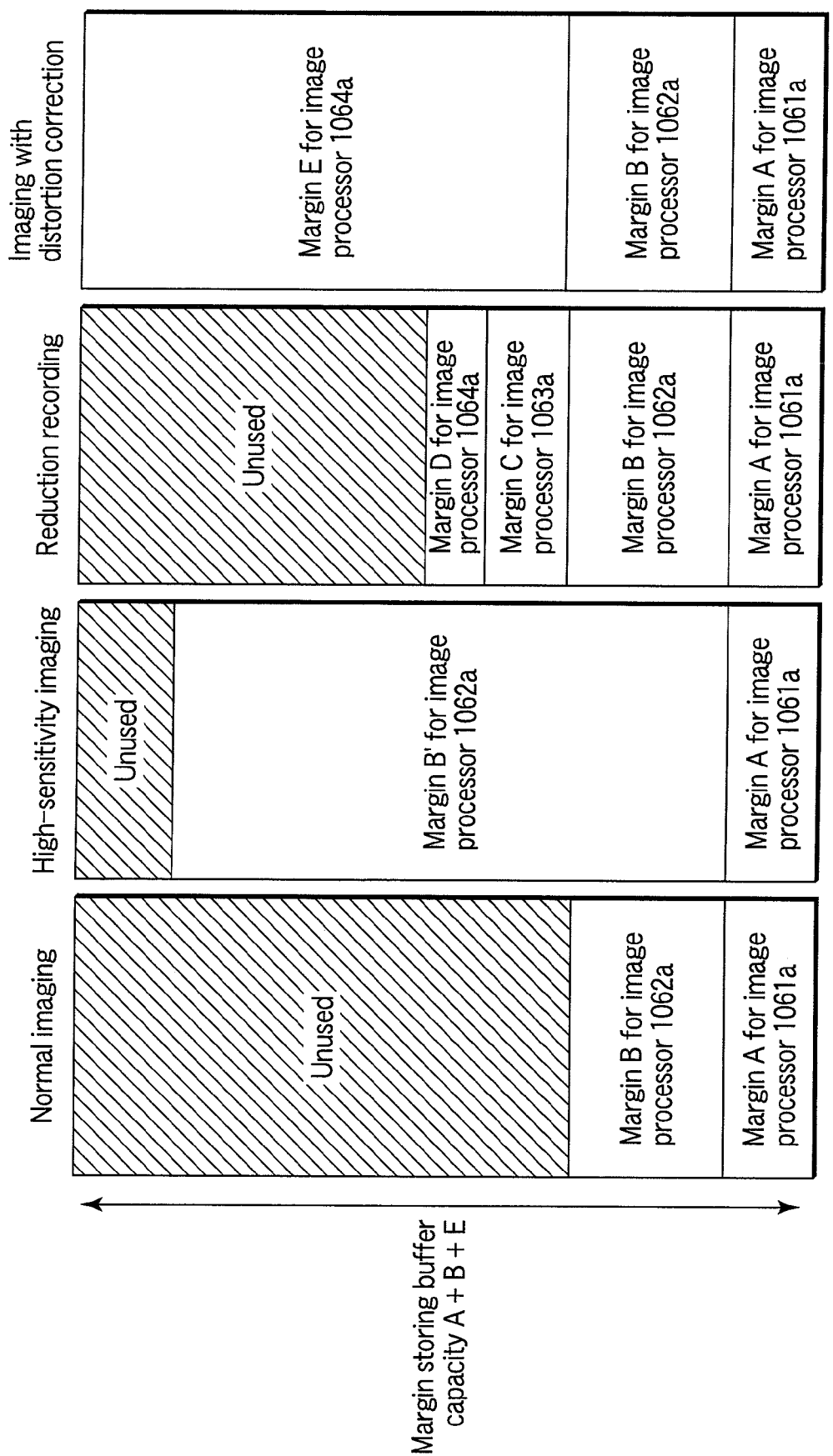

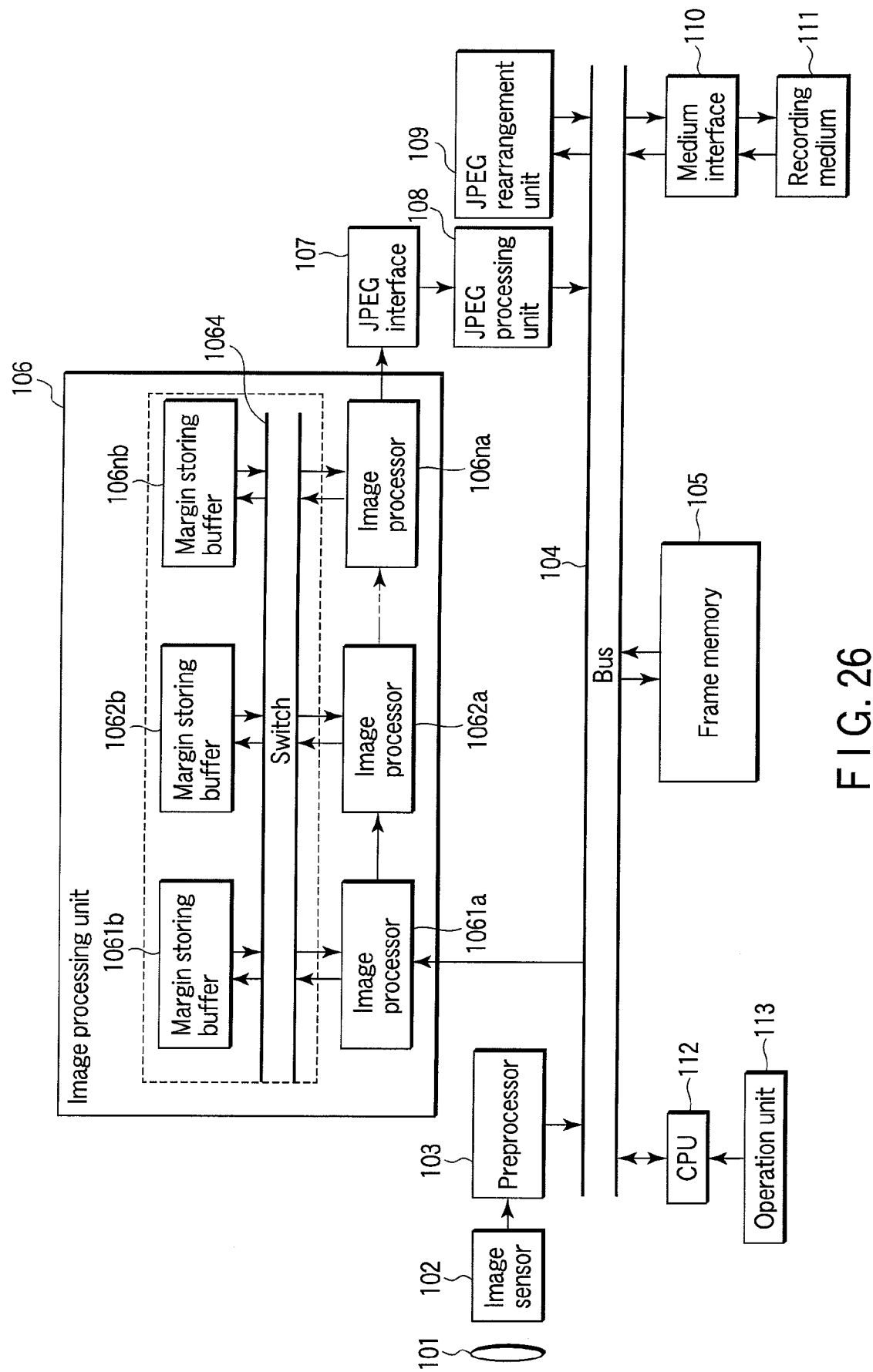
F I G. 26

IMAGE PROCESSING APPARATUS AND IMAGING APPARATUS

CROSS-REFERENCE TO RELATED APPLICATIONS

This application is based upon and claims the benefit of priority from prior Japanese Patent Applications No. 2009-094179, filed Apr. 8, 2009; No. 2009-113615, filed May 8, 2009; and No. 2009-126547, filed May 26, 2009, the entire contents of all of which are incorporated herein by reference.

BACKGROUND OF THE INVENTION

1. Field of the Invention

The present invention relates to an image processing apparatus and imaging apparatus capable of performing a plurality of image processing operations in direct connection with each other.

2. Description of the Related Art

With the recent increase in the number of pixels and the improved sequential shooting performance of the imaging apparatus such as a digital camera, demand has grown for an image processing apparatus capable of processing the image data having a vast number of pixels within a short time.

A technique for increasing the image data processing rate has been proposed by Jpn. Pat. Appln. KOKAI Publication No. 2000-312327, for example, in which a plurality of image processing operations are processed in pipelined fashion. According to Jpn. Pat. Appln. KOKAI Publication No. 2000-312327, a plurality of stages of an image processing unit for executing a plurality of spatial filtering processes such as the low-pass filtering processes and an image compression processing unit are directly connected to each other. Also, in Jpn. Pat. Appln. KOKAI Publication No. 2000-312327, the image data is read from a frame memory in units of a block having as many pixels along the columns as along the columns of a compression unit (generally called MCU (minimum coded unit)) and one line of pixels along the rows so that the image data can be input to the image compression processing unit from the last stage of the image processing unit for each compression unit required to execute the compression process in the image compression processing unit.

In the case where the image data is subjected to the spatial filtering process, the image data after processing is generally reduced in size as compared with the image data before processing. This is due to the fact that the image processing operation such as the spatial filtering process cannot process the peripheral portion of the image data input to the image processing unit. In the configuration in which the image processing unit and the image compression processing unit are directly connected to each other as disclosed by Jpn. Pat. Appln. KOKAI Publication No. 2000-312327, the number of pixels along the columns of the image data input from the last stage of the image processing unit to the image compression processing unit is required to be rendered equal to the number (or an integer multiple of the number) of the pixels along the columns of the compression unit. For this reason, according to Jpn. Pat. Appln. KOKAI Publication No. 2000-312327, the peripheral portion of each block is processed in overlapped fashion at the sacrifice of a reduced image processing efficiency.

A technique to avoid the overlapping process on the image data in the spatial filtering process has been proposed by, for example, Jpn. Pat. Appln. KOKAI Publication No. 2002-304624. According to this patent application, the intermediate data of the overlapped portion being processed in the filter processing means and to be used also for processing the next division image is stored in a frame memory (image memory), and by processing the next division image using the particular next division image and the intermediate data stored in the frame memory (image memory), the requirement of processing the overlapped portion a plurality of numbers of times is eliminated.

BRIEF SUMMARY OF THE INVENTION

According to a first aspect of the invention, there is provided an image processing apparatus which executes a plurality of image processing operations on an input image data picked up and stored in a frame memory, comprising: a plurality of image processors which read the input image data from the frame memory for each image data of a plurality of block lines each having a first number of pixels along the columns and a second number of pixels along the rows, and sequentially processing the image data of the block lines; and a margin storing buffer which, among the image data of the present block line input to each of the plurality of the image processors, stores the image data of the margin portion used also in the image processing of the image data of the next block line, wherein each of the plurality of the image processors, at the time of image processing on the image data of the next block line, performs the image processing on an image data including the image data of the present block line and the image data of the margin portion.

According to a second aspect of the invention, there is provided an image processing apparatus which executes a plurality of image processing operations on the input image data picked up and stored in a frame memory, comprising: a plurality of image processors to which the image data of a plurality of block lines each having a first number of pixels along the columns and a second number of pixels along the rows are sequentially input as the input image data, and in which the image processing is executed on the image data of the block lines; a margin storing buffer which, among the image data of the present block line input to each of the plurality of the image processors, stores the image data of the margin portion used also in the image processing on the image data of the next block line; a setting unit which sets an operation mode indicating a particular one of the plurality of the image processors to be used and the contents of the image processing in the image processor used; and a control unit which selects an image processor to be used from the plurality of the image processors in accordance with the operation mode set by the setting unit and selects the method of storing the image data of the margin portion in the margin storing buffer in accordance with the total value of the image data of the margin portion determined in accordance with a combination of the image processors selected in accordance with the operation mode, wherein each of the plurality of the image processors, at the time of image processing on the image data of the next block line, executes the image processing on a combination of the image data of the present block line and the image data of the margin portion.

According to a third aspect of the invention, there is provided an imaging apparatus comprising: an imaging unit which picks up an image of an object and obtains an image data; a frame memory which stores the image data obtained by the imaging unit; a plurality of image processors to which the image data of a plurality of block lines each having a first number of pixels along the columns and a second number of pixels along the rows are sequentially input from the frame memory, and which sequentially execute the image processing on the image data of the block lines; a margin storing buffer which, among the image data of the present block line input to each of the plurality of the image processors, stores the image data of the margin portion used also in the image processing on the image data of the next block line; a setting unit which sets an operation mode indicating a particular one of the plurality of the image processors to be used and the contents of the image processing in the image processor used; and a control unit which selects an image processor to be used from the plurality of the image processors in accordance with the operation mode set by the setting unit and also selects the method of storing the image data of the margin portion in the margin storing buffer in accordance with the total value of the image data of the margin portion determined in accordance with a combination of the image processors selected in accordance with the operation mode, wherein each of the plurality of the image processors executes, at the time of image processing on the image data of the next block line, the image processing on a combination of the image data of the present block line and the image data of the margin portion.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a diagram showing a detailed configuration of one of image processors and the corresponding one of margin storing buffers making up an image processing unit 106 according to the first embodiment;

FIG. 8 is a timing chart showing the operation of the image processing unit 106 according to the first embodiment;

FIGS. 10A, 10B, 10C and 10D are diagrams for explaining a margin for the distortion correction process;

FIGS. 11A and 11B are diagrams for explaining division block lines;

FIGS. 13A, 13B and 13C are diagrams for explaining the order in which the compressed image data are processed for each division block line;

FIG. 16 is a diagram showing the relation among the number of compression units along the rows, the number of compression units along the columns and the compression unit lines;

FIG. 23 is a diagram showing an example of the relation between contents of the image processing operation corresponding to the operation mode and the amount of the image data of the margin portion required for each image processing operation;

FIGS. 24A, 24B, 24C and 24D are diagrams showing the state of a margin storing memory 205 for each operation mode in the case where the capacity of the margin storing memory 205 is A+B+E;

FIG. 26 is a diagram showing a configuration of an imaging apparatus having an image processing apparatus according to a fourth embodiment of the invention.

DETAILED DESCRIPTION OF THE INVENTION

Embodiments of the invention are explained below with reference to the drawings.

First Embodiment

Figure 1:
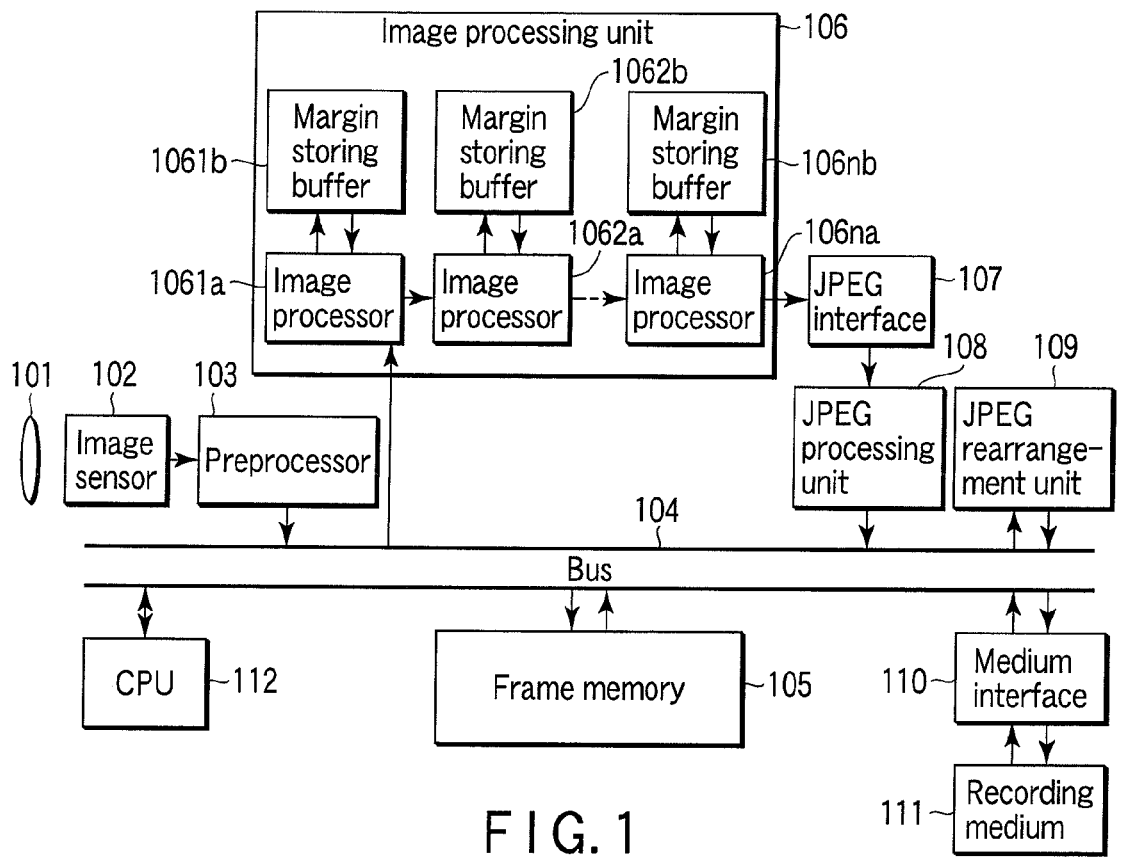
FIG. 1 is a diagram showing the configuration of an imaging apparatus having an image processing apparatus according to a first embodiment of the invention.

FIG. 1 is a diagram showing the configuration of an imaging apparatus having an image processing apparatus according to a first embodiment of the invention. The imaging apparatus shown in FIG. 1 includes a lens 101, an image sensor 102, a preprocessor 103, a bus 104, a frame memory 105, an image processing unit 106, a JPEG interface (I/F) 107, a JPEG processing unit 108, a JPEG rearrangement unit 109, a medium interface (I/F) 110, a recording medium 111 and a CPU 112.

The lens 101 condenses an optical image of an object on the image sensor 102. The image sensor 102 is configured of photoelectric conversion elements such as photodiodes arranged two-dimensionally on a light-receiving surface having, for example, color filters attached thereon in Bayer arrangement. This image sensor 102 converts the light condensed by the lens 101 into an electrical signal (image signal) and outputs it to the preprocessor 103. The image sensor 102 may be of either CMOS type or CCD type.

The preprocessor 103 executes the analog processes such as the correlated double sampling (CDS) process and the auto gain control (AGC) process on the image signal from the image sensor 102. Further, the preprocessor 103 generates the image data of the digital signal by A/D conversion of the analogically processed image signal.

The bus 104 is a transfer path for transferring the various data generated in the imaging apparatus to each block in the imaging apparatus. The bus 104 is connected to the preprocessor 103, the frame memory 105, the image processing unit 106, the JPEG processing unit 108, the JPEG rearrangement unit 109, the medium I/F 110 and the CPU 112.

The frame memory 105 stores therein the various data including the image data obtained in the preprocessor 103 and the image data processed in the JPEG processing unit 108. The frame memory 105 has a capacity to store the image data of at least one frame.

Figure 2:
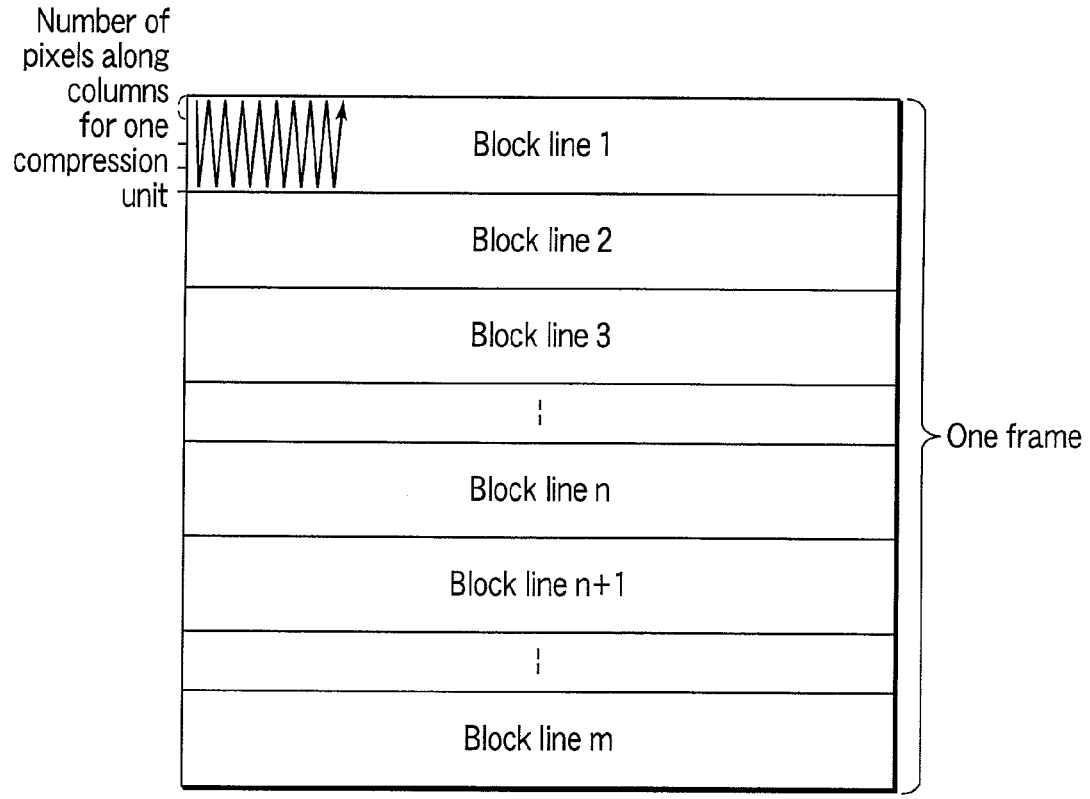
FIG. 2 is a diagram for explaining block lines.

The image processing unit 106 is configured of a plurality of image processors $1061a$, $1062a$, ..., $106na$ directly connected thereto. On the image data read from the frame memory 105, the image processing unit 106 sequentially executes a plurality of image processing operations such as converting the Bayer-arranged image data into the YCbCr data and the low-pass filtering process. Incidentally, the image processing unit 106 according to the first embodiment reads the image data from the frame memory 105 in units of block line. FIG. 2 shows the concept of the block lines. According to the first embodiment, each block line has pixels as many as an integer multiple of the compression unit along the columns (first number of pixels), and pixels corresponding to one row of one frame along the rows (second number of pixels). The compression unit is defined as a unit image data compressed by the JPEG processing unit 108. Also, according to this embodiment, one compression unit is configured of at least one MCU arranged along the rows.

Figure 3A:
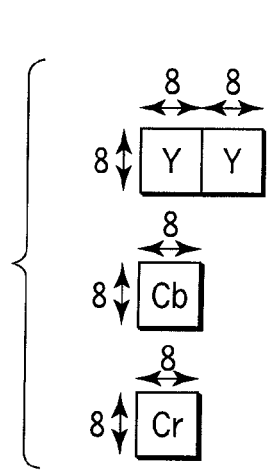
FIGS. 3A and 3B are diagrams for explaining a MCU.
Figure 3B:
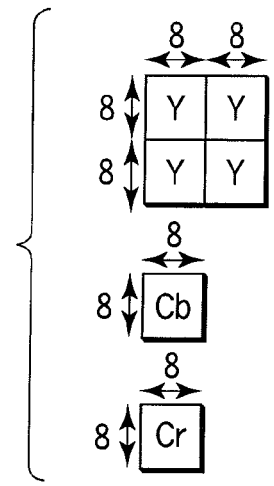

According to the JPEG standard, the discrete cosine transform (DCT) is performed with (8×8) pixels as one unit. A plurality of the image data of (8×8) pixels collected is generally called the MCU. In the case of the image data of the YC422 format (the image data having the data number ratio of Y:Cb:Cr=4:2:2 between brightness and color difference obtained after image processing), for example, one MCU is configured of, as shown in FIG. 3A, the sum of (16×8) pixels for Y, (8×8) pixels for Cb and (8×8) pixels for Cr. In the case of the image data of the YC420 format (the image data having the data number ratio of Y:Cb:Cr=4:1:1 between brightness and color difference obtained after image processing, and Cb=Cr), on the other hand, one MCU is configured of, as shown in FIG. 3B, the sum of (16×16) pixels for Y, (8×8) pixels for Cb and (8×8) pixels for Cr.

According to the JPEG standard, the compression process is executed in units of MCU and a marker called a restart marker is inserted at the end of the compression process. The compressed image data can be correctly decompressed by detecting the restart marker. According to this embodiment, one compression unit is determined by appropriately setting the interval at which the restart marker is inserted.

Figure 4A:
FIGS. 4A, 4B and 4C are diagrams for explaining a unit of compression (hereinafter referred to as a compression unit)
Figure 4B:
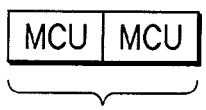
Figure 4C:
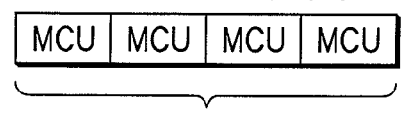

FIGS. 4A to 4C show an example of the compression unit. FIG. 4A shows an example in which one MCU makes up one compression unit. In this case, the restart marker is inserted at the end of compression of the image data of one MCU shown in FIG. 4A. Also, FIG. 4B shows a case in which two MCUs make up one compression unit. In this case, the restart marker is inserted at the end of compression of the image data of 2 MCUs. FIG. 4C shows an example in which 4 MCUs make up one compression unit, in which case the restart marker is inserted at the time point when the compression of the image data of 4 MCUs is ended. One compression unit is not limited to those shown in FIGS. 4A to 4C, but may be an integer multiple of the MCU.

According to this embodiment, the image processing unit 106 reads the image data column by column in the order indicated by arrow in FIG. 2 for each block line. By reading the image data in this way, the image data corresponding to the compression unit can be output from the image processing unit 106.

Also, according to this embodiment, a plurality of margin storing buffers $1061b$, $1062b$, ..., $106nb$ are arranged in correspondence with a plurality of the image processors $1061a$, $1062a$, ..., $106na$, respectively. The operation of the image processing unit 106 including the operation of the margin storing buffers $1061b$, $1062b$, ..., $106nb$ is described in detail later.

The JPEG I/F 107 is connected to the image processor in the last stage of the image processing unit 106 and configured of as many buffer memories as the compression units along the columns included in each block line. Each buffer memory has the capacity sufficient to store at least one image data of the compression unit. By use of the buffer memory having this configuration, the image data of the block line processed in the image processing unit 106 is divided for each compression unit.

At the time of recording the image data, the JPEG processing unit 108 operates in such a manner that the image data processed by the image processing unit 106 and read from the JPEG I/F 107 is compressed for each compression unit, and written in the frame memory 105 for each block compressed. At time of reproduction of the image data, on the other hand, the JPEG processing unit 108 operates in such a manner that the compressed image data recorded in the recording medium 111 is read and, after being decompressed, written in the frame memory 105.

In the JPEG rearrangement unit 109, the image data processed in the JPEG processing unit 108 and stored in the frame memory 105 is rearranged in order to be correctly reproduced. According to this embodiment, the image data of the block lines are read column by column as shown in FIG. 2, so that the image data corresponding to the compression unit can be output from the image processing unit 106. As a result, according to this embodiment, the correct compression process can be executed by the JPEG processing unit 108. In the process, the image data compressed in the JPEG processing unit 108 are arranged in the same order as shown in FIG. 2, and in this order, the compressed images are written in the frame memory 105. Normally, the image data is reproduced row by row, and therefore, once the image data is recorded in the recording medium 111 in the order shown in FIG. 2, the image data could not be reproduced properly. For this reason, the image data is rearranged by the JPEG rearrangement unit 109. For this rearrangement, the method proposed in, for example, Jpn. Pat. Appln. KOKAI Publication No. 2007-36596 can be used. According to this method, the restart markers inserted at the tail end of the compressed image data of the compression unit are counted row by row using a plurality of code counters, and according to each count, the write address of each compressed image data of the compression unit is controlled. Nevertheless, other methods may be used for rearrangement.

The medium I/F 110 controls the operation of writing and reading the image data in and from the recording medium 111. The recording medium 111 is configured of, for example, a memory card replaceably loaded in the imaging apparatus, and recorded therein the image data compressed by the JPEG processing unit 108.

The CPU 112 centrally controls the various sequences of, for example, the control operation in the image sensor 102, the preprocessor 103 and the image processing unit 106 of the imaging apparatus.

Next, the image processing unit 106 is explained in more detail. FIG. 5 is a diagram showing the detailed configuration of one image processor and a corresponding margin storing buffer in the image processing unit 106. Incidentally, the image processor having the configuration shown in FIG. 5 executes the filtering process on (3×3) pixels as image processing.

As shown in FIG. 5, the image processor includes an input buffer 201, an image data serial-parallel converter 202, a margin data serial-parallel converter 203 and a sum-of-products calculation unit 204. Also, the margin storing buffer has a margin storing memory 205.

The input buffer 201 holds the image data of each block line input as serial data from the frame memory 105 or the image processor in the immediately preceding stage, in the order shown in FIG. 2.

In the image data serial-parallel converter 202, the serial image data output from the input buffer 201 is converted into a parallel data thereby to generate the image data of (3×3) pixels required for the filtering process. The image data serial-parallel converter 202 includes two line buffers 301a, 301b, nine flip-flops (FF) 302a to 302i, six selectors 303a to 303f and a data switching controller 304. Of the nine FFs, the FF 302a is connected to the input buffer 201, and in the last stage of the FF 302a, the FFs 302d, 302g are connected in series through the selectors 303a, 303d, respectively. Also, the input buffer 201 is connected to the line buffer 301a. The FF 302b is connected to the line buffer 301a, and in the last stage of the FF 302b, the FFs 302e, 302h are connected in series through the selectors 303b, 303e, respectively. Further, the line buffer 301a is connected to the line buffer 301b. The FF 302c is connected to the line buffer 301b, and in the last stage of the FF 302c, the FFs 302f, 302i are connected in series through the selectors 303c, 303f, respectively. The FFs 302a to 302i are connected also to the sum-of-products calculation unit 204.

The line buffers 301a, 301b each have a sufficient capacity to hold the image data in an amount corresponding to the number of pixels along the columns (one line) of one block line. The line buffer 301a, after holding one line of image data from the input buffer 301, sequentially outputs the image data to the line buffer 301b and the FF 302b thereby to delay the input image data. Also, the line buffer 301b, after holding one line of the image data from the line buffer 301a, sequentially outputs the image data to the FF 302c thereby to further delay the input image data. Further, in the FFs 302a to 302i, the image data of one pixel thus far held is sequentially output each time the image data is input thereto. The image data of (3×3) pixels is generated by the line buffers 301a, 301b and the FFs 302a to 302i.

In the case where the filter size is other than (3×3) pixels, the number of the line buffers and the FFs is required to be changed accordingly. Generally, in the case where the filter size is (m×n), (n−1) line buffers and (m×n) FFs are required for the image data serial-parallel converter 202.

The selectors 303a to 303f select, in accordance with the data switching control signal, the image data output from the FFs 302a to 302f in the image data serial-parallel converter 202 or the image data corresponding to the margin portion output from the FFs 304a to 304g in the margin data serial-parallel converter 203. The data switching controller 304 performs the control operation by switching the data switching control signal. The operation of the data switching controller 304 by switching the data switching control signal is described in detail later.

In the margin data serial-parallel converter 203, the image data of the margin portion output as a serial data from the margin storing memory 205 of the margin storing buffer is converted to parallel data. This margin data serial-parallel converter 203 is configured of six FFs 304a to 304g. In the FFs 304a to 304g, the image data of one pixel thus far held is sequentially shifted each time the image data is input thereto. The FFs 304a to 304g generate the image data of (2×3) pixels from the image data of the margin portion input from the margin storing memory 205.

The number of the FFs of the margin data serial-parallel converter 203 is changed by the number of the pixels of the image data of the margin portion described later.

The sum-of-products calculation unit 204 executes the sum-of-products calculation process for filter operation on the image data of (3×3) pixels output from the FFs 302a to 302i. The coefficient multiplied by the image data output from each of the FFs 302a to 302i is changed in accordance with the type of the filter used for image processing.

The margin storing memory 205 of the margin storing buffer is configured of, for example, a static RAM (SRAM) wherein a part of the image data output from the input buffer 201 is stored as the image data of the margin portion.

Now, the concept of the margin is explained. Generally, in the case where the image is processed by a spatial filter such as a low-pass filter, the size of the image data after image processing is known to be smaller than that of the image data input to the image processor. This is due to the fact that the process executed by the spatial filter generates some area incapable of filtering, in the peripheral portion (upper end, lower end, right end or left end) of the image data input to the image processor. In order to process a predetermined area of the image data obtained through the image sensor 102, therefore, an image signal for an area larger than the predetermined area is acquired by the image sensor 102, and the image data for the area larger than the predetermined area is required to be processed. According to this embodiment, the image data corresponding to this extraneous area is defined as "margin".

Further, in the case where the image processing unit 106 is connected directly to the JPEG processing unit 108 as in this embodiment, the image data is read from the frame memory 105 in units of block line as shown in FIG. 2. In this case, each image processing session for the image data of the block line develops an area incapable of image processing. Each time the image data of the block line is processed, therefore, the image data of the margin portion is also required to be processed. In this process, the margin at the lower end of a given block line n is overlapped on the margin at the upper end of the next block line n+1.

The number of pixels along the columns of the image data in the margin portion is determined by the number of the taps of the filter used for the spatial filtering process and the number of times the spatial filtering process is executed. Generally, (m−1) pixels along the columns in the margin are required for the image processing using a central interpolation filter (m taps) of (m×m). In the case of the (3×3) filter described above, for example, two pixels are required along the columns for the image data in the margin portion. Also, four pixels along the columns are required for the image data of the margin portion in the image processing using a (5×5) filter. Further, in the case where a plurality of spatial filtering processes are executed in direct connection with each other, the number of pixels required along the columns for the image data of the margin portion is the total sum of the pixels of the margins of the spatial filters. In the case where the (5×5) filter and the (3×3) filter are used in direct connection for image processing, for example, six pixels are required along the columns for the image data of the margin portion.

According to this embodiment, at the time of image processing on the image data on a given block line n, the image data of the margin portion used also for image processing of the next block line n+1 is stored in the margin storing memory 205 on the one hand, and the image data of the margin portion stored in the margin storing memory 205 at the time of image processing on the preceding block line n−1 is also used on the other hand.

Figure 6:
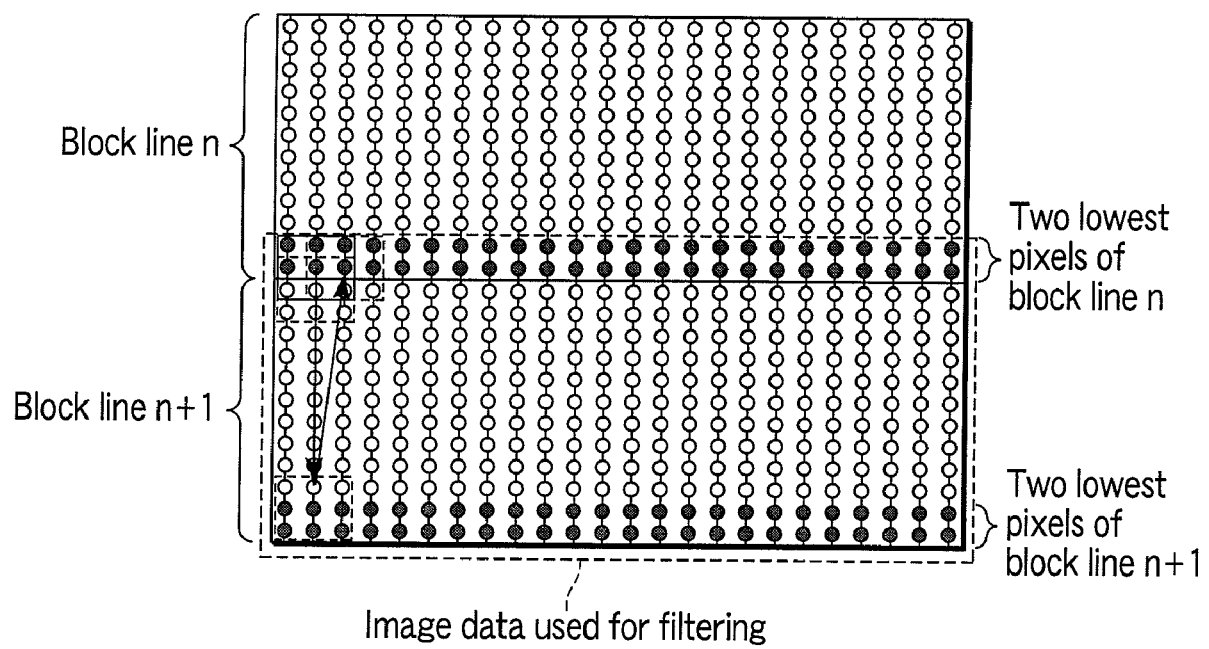
FIG. 6 is a diagram showing the concept of operation of the image processing unit 106 according to the first embodiment.

Now, the detailed operation of the image processing unit 106 according to this embodiment is explained. FIG. 6 is a diagram showing the concept of operation of the image processing unit 106. Incidentally, the example shown in FIG. 6 represents a case in which the image processing is conducted on the image data of the block line n+1 using a (3×3) filter (with two pixels of the margin portion along the columns as described above).

At the time of image processing on the image data on the block line n, the image data of the block line n stored in the input buffer 201 is read as a serial data in the order shown in FIG. 2. In the process, when the image data corresponding to the two lowest rows of the block line n (the image data indicated by hatching in FIG. 6) is read from the input buffer 201, the image data corresponding to the particular two lowest rows is stored in the margin storing memory 205 as an image data for the margin portion.

At the time of image processing on the image data of the block line n, the image data stored in the margin storing memory 205 at the time of image processing on the block line n−1 is also processed. The explanation about the image processing on the block line n is similar to the explanation about the image processing on the next block line n+1, and therefore, not explained again.

Next, the image processing on the image data of the block line n+1 is explained. As described above, the image data is input line by line in the order shown in FIG. 2 from the input buffer 201. Before the image data corresponding to the first pixel (upper end) on each line of the block line n+1 is read from the input buffer 201, the margin image data (for two pixels along the columns) corresponding to the same line as the line read from the input buffer 201 is read as serial data from the margin storing memory 205 and sequentially input to the FF 304a. The margin image data thus far held in the FFs 304a to 304g are sequentially shifted to the next stage. As a result, the margin image data input from the margin storing memory 205 is converted into parallel data.

After that, before the image data corresponding to the first pixel (upper end) on each line of the block line n+1 is read from the input buffer 201, the data switching controller 304 switches the data switching control signal in such a manner as to select the margin image data input from the FFs 304a to 304g. At the time of reading the image data corresponding to the second pixel on each line of the block line n+1 from the input buffer 201, the data switching controller 304 switches the data switching control signal in such a manner as to select the image data input from the FFs 302a to 302f.

Each time the image data is input to the FFs 302a to 302i, the image data thus far held in the FFs 302a to 302i are shifted to the next stage. Once the image data of (3×3) pixels is input to the sum-of-products calculation unit 204, the sum-of-products operation (filter process) is performed on the input image data of (3×3) pixels.

Subsequently, the operation of reading the margin image data from the margin storing memory 205, selecting the margin image data by the data switching controller 304 and selecting the image data to be read from the input buffer 201 is performed repeatedly for each line making up each block line. In this way, the filtering process is executed for each (3×3) pixels in the block line n+1 as shown in FIG. 6.

Further, in the case where the image data corresponding to the two lowest rows of the block line n+1 (the image data indicated by hatching in FIG. 6) is read from the input buffer 201, the image data corresponding to the particular two lowest rows is stored in the margin storing memory 205 as the image data of the margin portion. This image data of the margin portion stored in the margin storing memory 205 is used for processing the image data on the next block line n+2.

Figure 7:
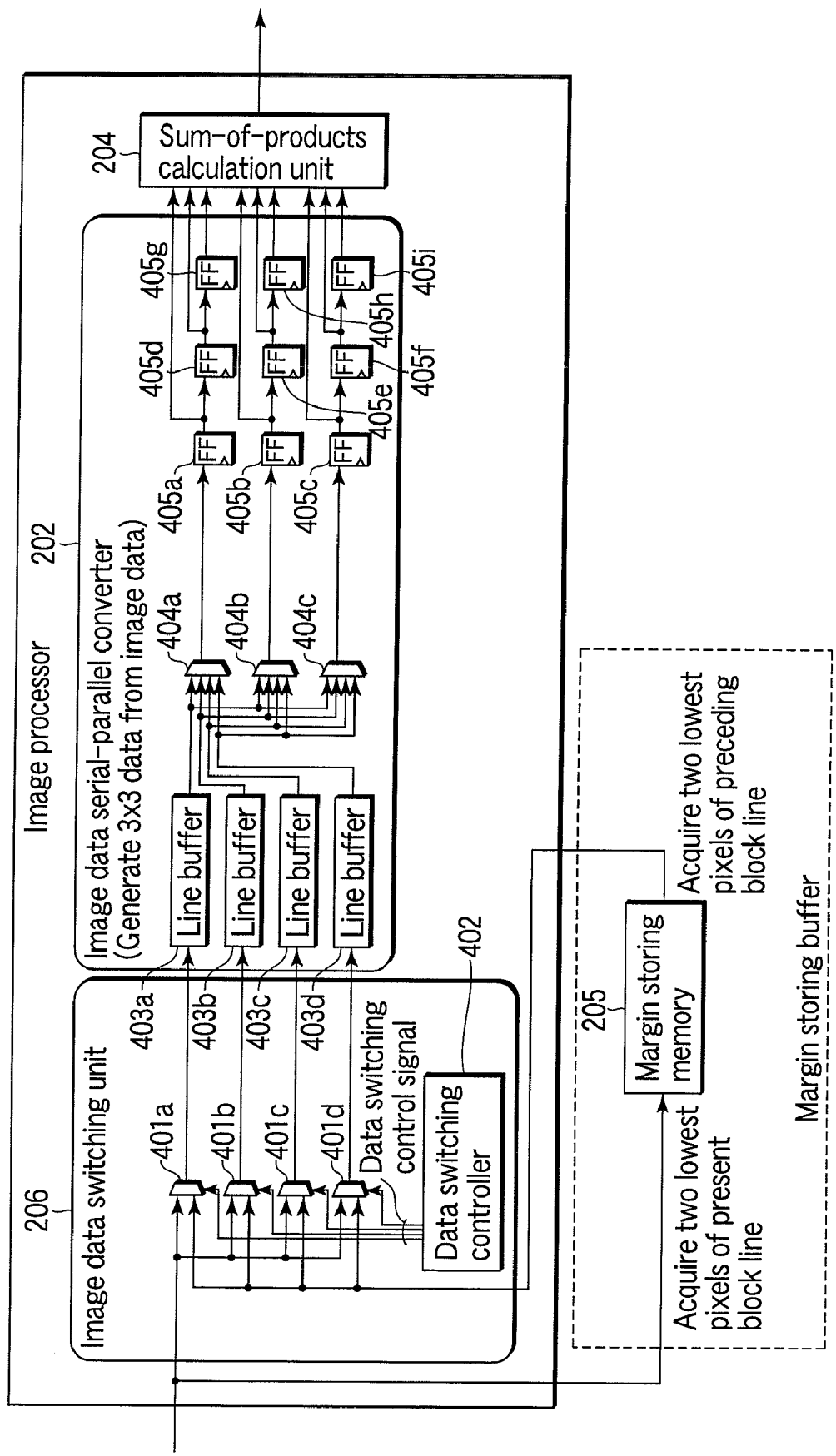
FIG. 7 is a diagram showing a configuration of the image processing unit and the margin storing buffer according to the first embodiment.

The configuration of the image processor and the margin storing buffer shown in FIG. 5 is only an example and can be appropriately changed. FIG. 7 is a diagram showing a configuration according to a modification of the image processor and the margin storing buffer. In the case of FIG. 7, the image data of the margin portion is supplemented before the line buffer. Incidentally, FIG. 7, like FIG. 5, illustrates the configuration of the image processor for executing the filtering process of (3×3) pixels as image processing.

As shown in FIG. 7, the image processor according to this modification includes an image data switching unit 206, an image data serial-parallel converter 202, and a sum-of-products calculation unit 204. Also, the margin storing buffer includes a margin storing memory 205.

The image data switching unit 206 includes four selectors 401a to 401d and a data switching controller 402. The selector 401a selects, in accordance with the data switching control signal, the input image data of one block line input from the frame memory 105 or the image processor in the immediately preceding stage or the image data for the margin portion stored in the margin storing memory 205 of the margin storing buffer, and outputs the selected image data to the line buffer 403a of the image data serial-parallel converter 202. The selector 401b select the input image data or the image data of the margin portion in accordance with the data switching control signal, and outputs the selected image data to the line buffer 403b of the image data serial-parallel converter 202. The selector 401c selects the input image data or the image data of the margin portion in accordance with the data switching control signal, and outputs the selected image data to the line buffer 403c of the image data serial-parallel converter 202. The selector 401d selects the input image data or the image data of the margin portion in accordance with the data switching control signal, and outputs the selected image data to the line buffer 403d of the image data serial-parallel converter 202. The data switching controller 402 controls by switching the data switching control signal.

The image data serial-parallel converter 202 includes four line buffers 403a to 403d, three selectors 404a to 404c and nine flip-flops (FF) 405a to 405i. The four line buffers 403a to 403d are connected to the selectors 404a to 404c, respectively. Further, the selector 404a is connected to the FF 405a, the selector 404b to the FF 405b and the selector 404c to the FF 405c. Furthermore, the FFs 405a, 405d and 405g are connected in series to each other on the one hand, and to the sum-of-products calculation unit 204 at the same time. Also, the FFs 405b, 405e and 405h are connected in series to each other on the one hand, and to the sum-of-products calculation unit 204 at the same time. Further, the FFs 405c, 405f and 405i are connected in series to each other on the one hand, and to the sum-of-products calculation unit 204 at the same time. The line buffers 403a to 403d each hold the image data for the number of pixels along the columns of one block line (one line). Also, each time the image data is input thereto, the FFs 405*a* to 405*i* sequentially output the image data of one pixel thus far held.

The sum-of-products calculation unit 204, as in FIG. 5, calculates the sum of products for filter operation on the image data of (3×3) pixels output from the FFs 405*a* to 405*i*.

In the configuration shown in FIG. 7, the operation similar to the one performed in the configuration of FIG. 6 is performed by appropriately switching the data switching control signal. In order to realize the same operation in FIG. 7 as in FIG. 6, the image data of the margin portion is controlled to be written in the line buffer 403*a* at the timing of starting the first line of the block line, and after that, the input image data is controlled to be written in the line buffer 403*a*. Similarly, in the next line, the image data of the margin portion is written in the line buffer 403*b* at the timing of starting the line, and after that, the input image data is written in the line buffer 403*b*. Also, in the next and subsequent lines, the image data of the margin portion and the input image data are sequentially and alternately written in the line buffer 403*c*, the line buffer 403*d*, the line buffer 403*a*, the line buffer 403*b*, and so forth.

According to the aforementioned method in which the image data of the margin portion and the input image data are written alternately, a time loss occurs in the case where the image data of the margin portion is large in amount. In such a case, the image data can be written without any time loss, for example, by writing the input image data in the line buffer 403*a* while the image data of the margin portion is being written in the line buffer 403*b*.

By carrying out the image processing with the image processing unit 106 having the configuration described above, the image data of the margin portion is not required to be read out at the time of reading the image data of each block line, and an overlap process of the margin portion is not required.

Further, by storing the image data of the margin portion in the margin storing buffers 1061*b* to 106*nb*, the band of the bus 104 is not overburdened even in the case where the number of the image processors directly connected thereto is increased.

FIG. 8 is a timing chart showing the operation of the image processing unit 106 according to this embodiment. In the example shown in FIG. 8, the (3×3) filtering process is executed in the image processor 1061*a* and the (5×5) filtering process is executed in the image processor 1062*a*.

As shown in FIG. 8, according to this embodiment, substantially all the portions of the image data input to and processed in the first-stage image processor 1061*a* can be handled as a valid data. Therefore, the image processor 1062*a* in the next stage is not required to wait until the image data of a valid portion is input thereto, resulting in an improved image processing efficiency.

Figure 9:
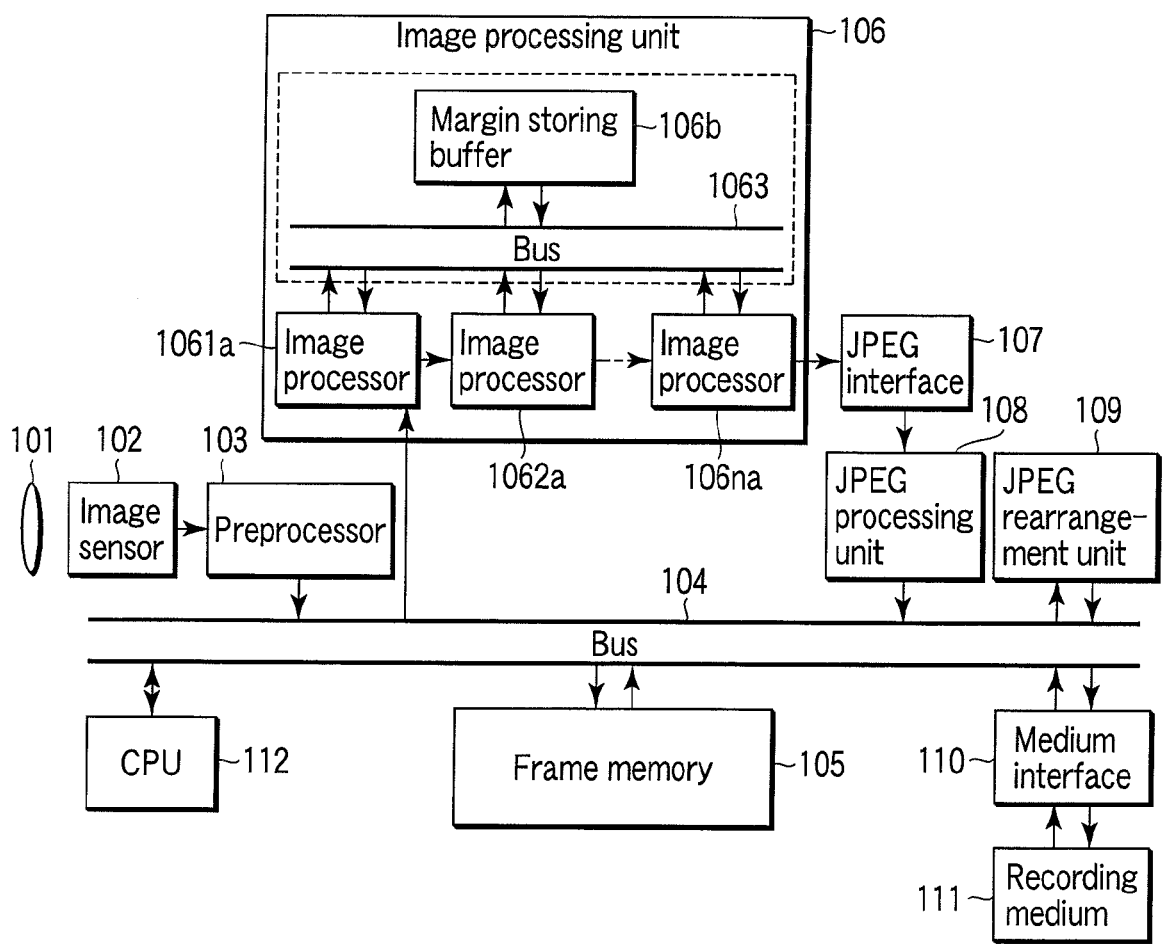
FIG. 9 is a diagram showing a configuration having only one margin storing buffer according to a modification of the first embodiment.

In the case of FIG. 1, the margin storing buffer is arranged in correspondence with each of the plurality of the image processors in the image processing unit 106. As an alternative, as shown in FIG. 9, only one margin storing buffer 106*b* having a capacity at least equal to the total capacity of the margin storing buffers 1061*b*, 1062*b*, . . . , 106*nb* is arranged, so that the data may be transferred between the margin storing buffer 106*b* and each image processor through the bus 1063. Generally, it is known that a higher area efficiency can be achieved by one large-capacity memory than by a plurality of small-capacity memories. The shown modification, therefore, can reduce the area of the margin storing buffer.

The memory usable as the margin storing buffer 106*b* is not specifically limited, and any memory of high integration can be used as the margin storing buffer 106*b*. Some examples of the memories that can be used as the margin storing buffer 106*b* include the eDRAM (Embedded DRAM), MRAM (Magnetoresistive RAM), FeRAM (Ferroelectric RAM), ReRAM (Resistance RAM), PRAM (Phase change RAM), 1T-SRAM (One Transistor SRAM), Z-RAM (Zero capacitor RAM) and TTRAM (Twin Transistor RAM).

The method of image processing by the image processing unit 106 according to the first embodiment, though applicable with the spatial filter process, is applicable also with the distortion correction process with equal effect. The distortion correction process is for correcting the distorted image data such as barrel-shaped one to a distortion-free image data as shown in FIG. 10A. Also in this distortion correction process, the image data of the margin portion described above is required.

Now, an explanation is given about the input image data required for executing the distortion correction process on the block lines 1 to 3 shown in FIG. 10A.

In the case where the distortion correction process is executed on the block line 1, at least the distorted block line 1 is read and processed. The hardware configuration, however, is simplified by executing the process on a rectangular data. Normally, therefore, a rectangular data containing the distorted block line 1 as designated by reference numeral 501 in FIG. 10B is read and processed. Similarly, the block line 2 is processed by reading a rectangular data containing the distorted block line 2 as designated by reference numeral 502 in FIG. 10C. Also, the block line 3 is processed by reading a rectangular data containing the distorted block line 3 as designated by reference numeral 503 in FIG. 10D.

In the case where the image data is read for each rectangular block line as described above, the block lines 1, 2, 3 develop a portion requiring an overlap process on the input image data as shown in FIGS. 10C and 10D. Like in the embodiment described above, the overlap process is eliminated by storing the image data corresponding to the overlapped portion in the margin storing buffer as an image data of the margin portion.

Incidentally, the distortion correction process shown in FIGS. 10A to 10D represents a case in which the image data is distorted in the shape of barrel. This embodiment, however, is applicable also to a case in which the image data is distorted in the shape of pincushion or the correction of the chromatic aberration (the distorted state is varied from one color to another).

Second Embodiment

Next, a second embodiment of the invention is explained. The configuration of the image processing apparatus according to the second embodiment is substantially identical with that of the image processing apparatus shown in FIG. 1, and therefore, not described in detail below.

According to this embodiment, the image data stored in the frame memory 105 is read in units of division block line by the image processing unit 106. FIG. 11A shows the concept of the division block lines. According to this embodiment, one block line is divided into three division block lines along the rows as the image data. The image processing unit 106 according to this embodiment reads the image data in such a manner that each of the division block lines is read column by column as indicated by arrows in FIG. 11B. By reading the block lines in this way, the image data corresponding to the compression unit can be output from the image processing unit 106.

Figure 12:
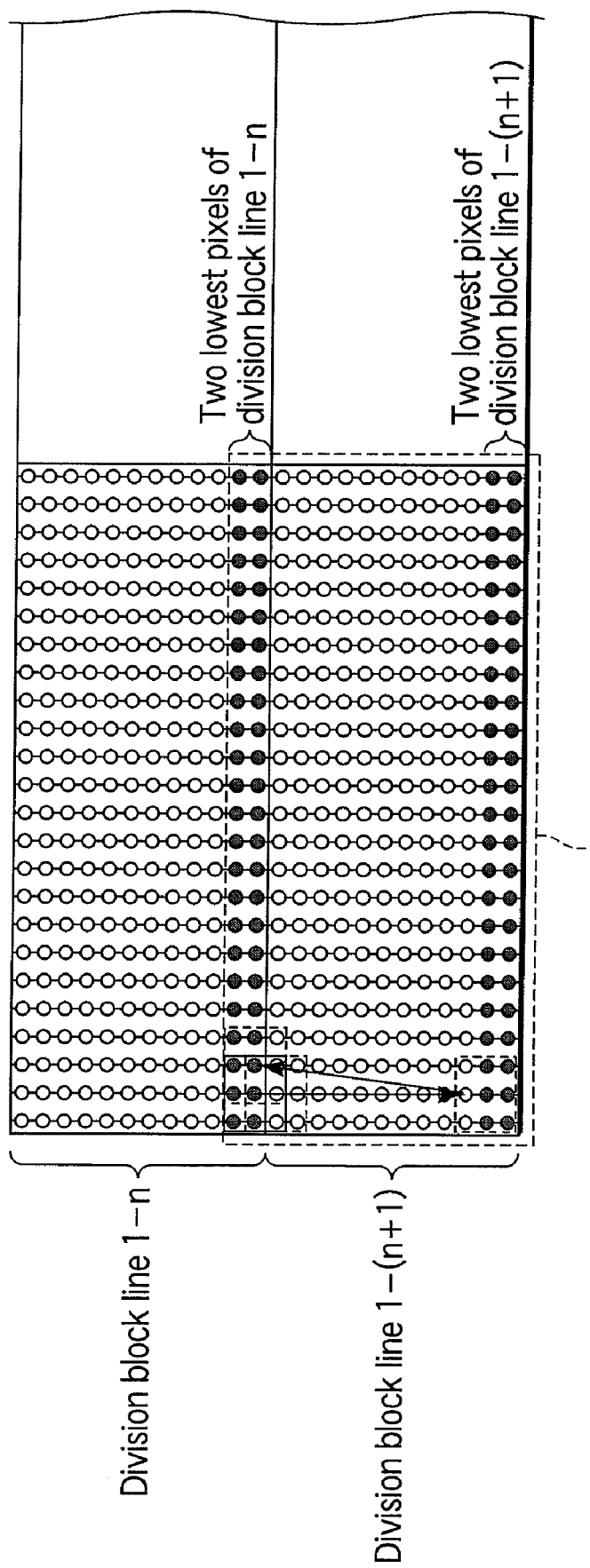
FIG. 12 is a diagram showing the concept of operation of the image processing unit 106 according to a second embodiment of the invention.

Next, the detailed operation of the image processing unit 106 according to this embodiment is explained. FIG. 12 is a diagram showing the concept of operation of the image processing unit 106. Incidentally, the example shown in FIG. 12 represents a case in which the image processing is carried out using a (3×3) filter (two pixels of the margin portion along the columns described above) on the image data on the division block line 1-(*n*+1).

According to this embodiment, at the time of image processing on the image data of a given division block line 1-*n*, the image data of the margin portion used in the image processing on the division block line 1-(*n*+1) subsequent to the division block line 1-*n* is stored in the margin storing memory 205. At the time of image processing on the image data of the division block line 1-*n*, the image data stored in the margin storing memory 205 at the time of image processing on the division block line 1-(*n*−1) is also processed. In the image processing in units of division block line described above, the margin is required not only along the columns but also along the rows, for example, between the right end of the division block line 1-*n* and the left end of the right adjacent division block line 2-*n*. Taking the margin along the rows into consideration, however, complicates the process, and therefore, according to this embodiment, the margin along the rows is ignored.

In the image processing on the image data of the division block line 1-*n*, the image data of the division block line 1-*n* stored in the input buffer 201 are read out in the order shown in FIG. 11B as serial data and processed. In the process, the image data corresponding to the two lowest rows of the division block line 1-*n* (the image data indicated by hatching in FIG. 12), if read out from the input buffer 201, is stored in the margin storing memory 205 as the image data of the margin portion.

At the time of image processing of the image data of the division block line 1-*n*, the image data stored in the margin storing memory 205 at the time of image processing of the division block line 1-(*n*−1) is also processed. The image processing of the division block line 1-*n* is similar to the image processing of the next division block line 1-(*n*+1), and therefore, not described any more.

Now, the image processing on the image data of the division block line 1-(*n*+1) is explained. As described above, the image data is input from the input buffer 201 line by line in the order indicated in FIG. 11B. Before the image data corresponding to the first pixel (upper end) in each line of the division block lines 1-(*n*+1) is read from the input buffer 201, the margin image data (two pixels along the columns) corresponding to the same line as the one read from the input buffer 201 is read as a serial data from the margin storing memory 205, and sequentially input to the FF 304*a*. Also, the margin image data held in the FFs 304*a* to 304*f* are shifted sequentially to the subsequent stages. As a result, the margin image data input from the margin storing memory 205 is converted into parallel data.

After that, before the image data corresponding to the first pixel (upper end) in each line of the division block line 1-(*n*+1) is read from the input buffer 201, the data switching controller 304 switches the data switching control signal in such a manner as to select the margin image data input from the FFs 304*a* to 304*f*. Then, at the time of reading the image data corresponding to the second pixel in each line of the division block lines 1-(*n*+1) from the input buffer 201, the data switching controller 304 switches the data switching control signal in such a manner as to select the image data input from the FFs 302*a* to 302*f*.

Each time the image data is input to the FFs 302*a* to 302*i*, the image data thus far held in the FFs 302*a* to 302*i* are shifted to subsequent stages. Once the image data of (3×3) pixels are input to the sum-of-products calculation unit 204, the sum-of-products calculation (filtering process) is carried out on the input image data of (3×3) pixels.

After that, the above-mentioned operations of reading the margin image data from the margin storing memory 205, selecting the margin image data by the data switching controller 304 and selecting the image data read from the input buffer 201 are repeated for each line of the division block lines. In this way, as shown in FIG. 12, the filtering process is executed for each (3×3) pixels in the division block line 1-(*n*+1).

Further, the image data corresponding to the two lowest rows of the division block line 1-(*n*+1) (the image data indicated by hatching in FIG. 12), if read from the input buffer 201, are stored in the margin storing memory 205 as the image data for the margin portion. This image data for the margin portion stored in the margin storing memory 205 is used at the time of processing the image data in the next division block line 1-(*n*+2).

As the result of image processing by the image processing unit 106 having the configuration described above, the image data for the margin portion is not required to be read out at the time of reading the image data of each division block line, and an overlap process of the margin portion is not required.

Further, the fact that the image data for the margin portion is stored in the margin storing buffers 1061*b* to 106*nb* prevents the band of the bus 104 from being overburdened even in the case where the number of the image processors directly connected is increased.

Also, in view of the fact that the image data for the margin portion is stored for each division block line, the capacity of the margin storing buffer may be decreased as compared with the case in which the image data for the margin portion is stored for each block line.

Next, the JPEG rearrangement unit 109 according to the second embodiment is explained in more detail.

Assume that the image processing is carried out for each three division block lines into which the image data of one frame shown in FIG. 13A is divided along the rows. In the example shown in FIG. 13A, the image data of one frame is formed by arranging the image data of H compression units along the rows and V compression units along the columns. Also, one division block line is formed by arranging the image data of M compression units along the rows and four compression units along the columns. Incidentally, in FIG. 13A, reference numerals 1-1 to H-V are attached to the image data of each compression unit from the upper left end for the convenience of the subsequent explanation. Also, though not shown in FIG. 13A, assume that reference numerals 1-1 to H-V are attached also to each division block line from the upper left end.

Figure 13B:
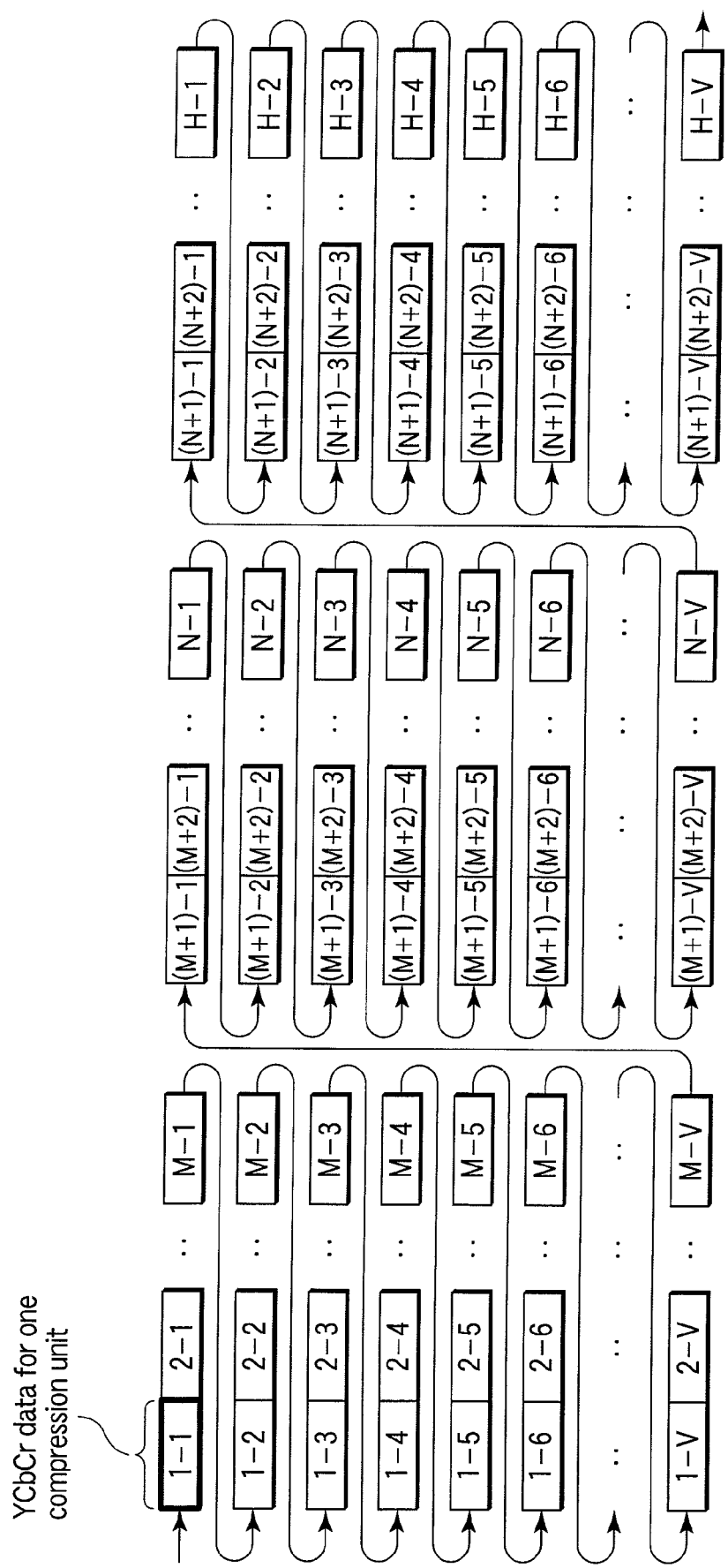
Figure 13C:
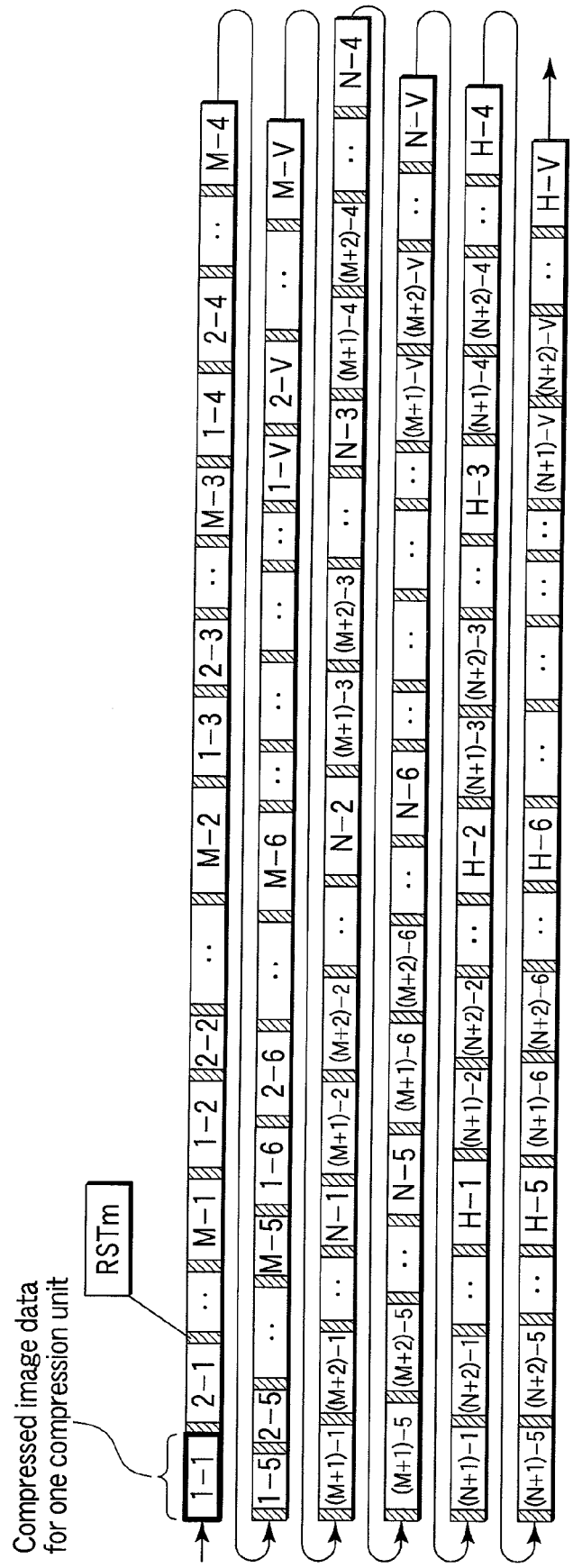

As described above, according to this embodiment, the image data is input for each division block line. As a result, the image data shown in FIG. 13A, after being variously processed by the image processing unit 106, are input to the JPEG processing unit 108 through the JPEG I/F 107 as compression units 1-1, 2-1, . . . , M-1, 1-2, 2-2, . . . , M-2, 1-3, 2-3, . . . , M-3, 1-4, 2-4, . . . , M-4, 1-5, 2-5, . . . , M-5, 1-6, . . . , M-V, (M+1)-1, (M+2)-1, . . . , N-1, (M+1)-2, . . . , N-V, (N+1)-1, . . . , H-V in that order as shown in FIG. 13B. Then, as shown in FIG. 13C, the image data are compressed sequentially. Each time the compression process of the image data of these compression units is finished, a restart marker RSTm is inserted as the identification information indicating the boundary of the compression unit. The restart marker RSTm is numbered in the order of insertion.

Normally, the image data is reproduced sequentially row by row. Therefore, the compressed image data, if recorded in the recording medium 111 in the order shown in FIG. 13C, could not be properly reproduced.

According to this embodiment, therefore, the compressed image data are rearranged in the JPEG rearrangement unit 109 so that the compressed image data compressed in the order shown in FIG. 13C may be recorded in the recording medium 111 in the order of rows corresponding to the reproduction.

Figure 14:
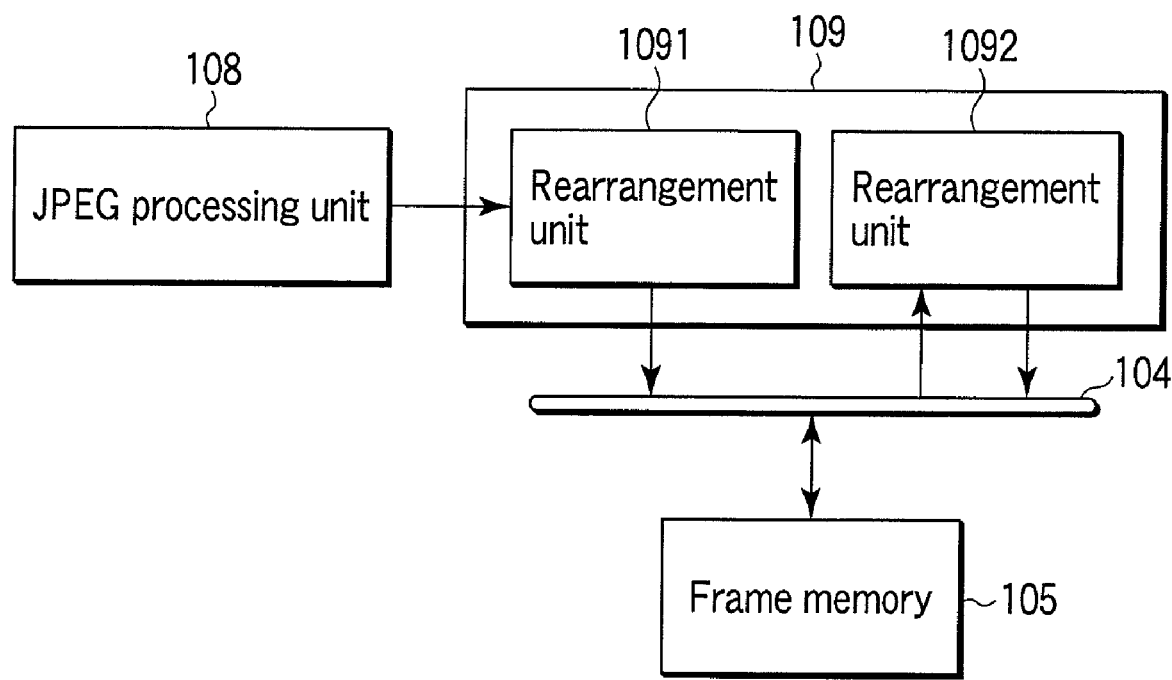
FIG. 14 is a diagram showing a schematic configuration of a JPEG rearrangement unit according to the second embodiment.

FIG. 14 is a diagram showing a schematic configuration of the JPEG rearrangement unit 109 according to the second embodiment. As shown in FIG. 14, the JPEG rearrangement unit 109 includes two rearrangement units 1091, 1092.

The rearrangement unit 1091 generates the rearrangement header data required for rearrangement of the compressed image data and writes the generated rearrangement header data in the frame memory 105 together with the compressed image data input from the JPEG processing unit 108.

Figure 15:
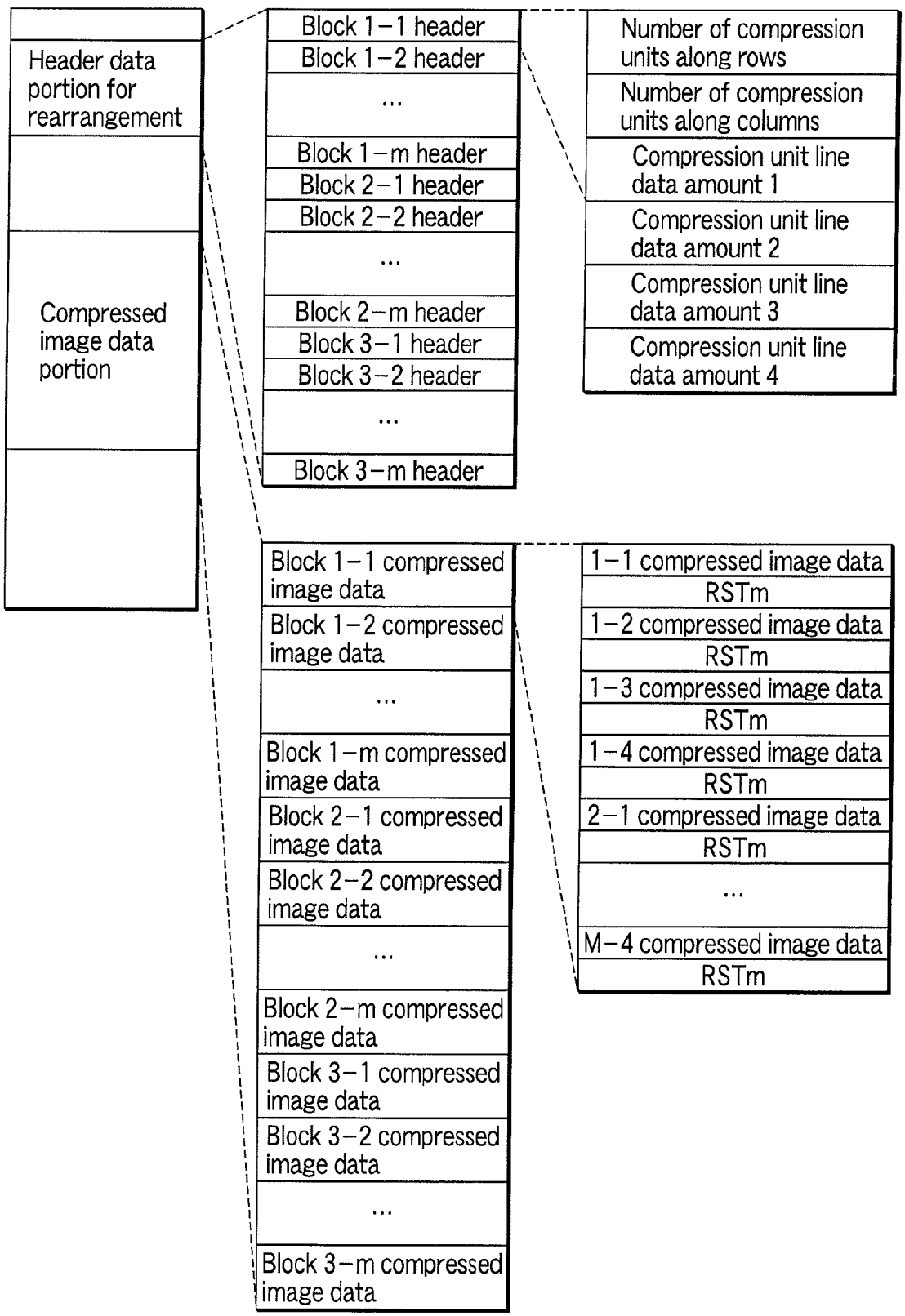
FIG. 15 is a diagram showing the format of the compressed image data written in a frame memory 105 by a rearrangement unit 1091.

FIG. 15 shows a data format of the compressed image data written in the frame memory 105 by the rearrangement unit 1091. As shown in FIG. 15, the compressed image data written in the frame memory 105 has a rearrangement header data portion and a compression image data portion. The rearrangement header data portion is configured to have a rearrangement header data corresponding to each division block line.

The rearrangement header data includes the number of compression units along the rows, the number of compression units along the columns and the compression unit line data amount. The number of compression units along the rows indicates the number of the compression units arranged in the direction along each row of the corresponding division block line. The number of compression units along the columns, on the other hand, indicates the number of the compression units arranged in the direction along each column of the corresponding division block. Further, the compression unit line data amount indicates the amount of the compressed image data (hereinafter referred to as the compression unit line) having one division block line along the rows and one compression unit along the columns. This data amount is recorded in the number of the compression unit lines (four in the case shown in FIGS. 13A to 13C) in one division block line. FIG. 16 shows the relation among the number of the compression units along the rows, the number of the compression units along the columns and the compression unit lines.

The number of the compression units along the rows and the number of the compression units along the columns are determined by the manner in which the division block line is divided. Also, the compression unit line data amount varies from one compression unit line to another. The compression unit line data amount, therefore, is determined by counting the data amount each time the image data of each compression unit line is input.

The compressed image data portion is where the compressed image data processed by the JPEG processing unit 108 is written in.

In the rearrangement unit 1092, the header data for rearrangement and the compressed image data for each compression unit written in the frame memory 105 by the rearrangement unit 1091 as shown in FIG. 15 are read, and after rearranging the compressed image data for each compression unit in normal order, written back in the frame memory 105.

The rearrangement units 1091, 1092 are each described in detail below.

Figure 17:
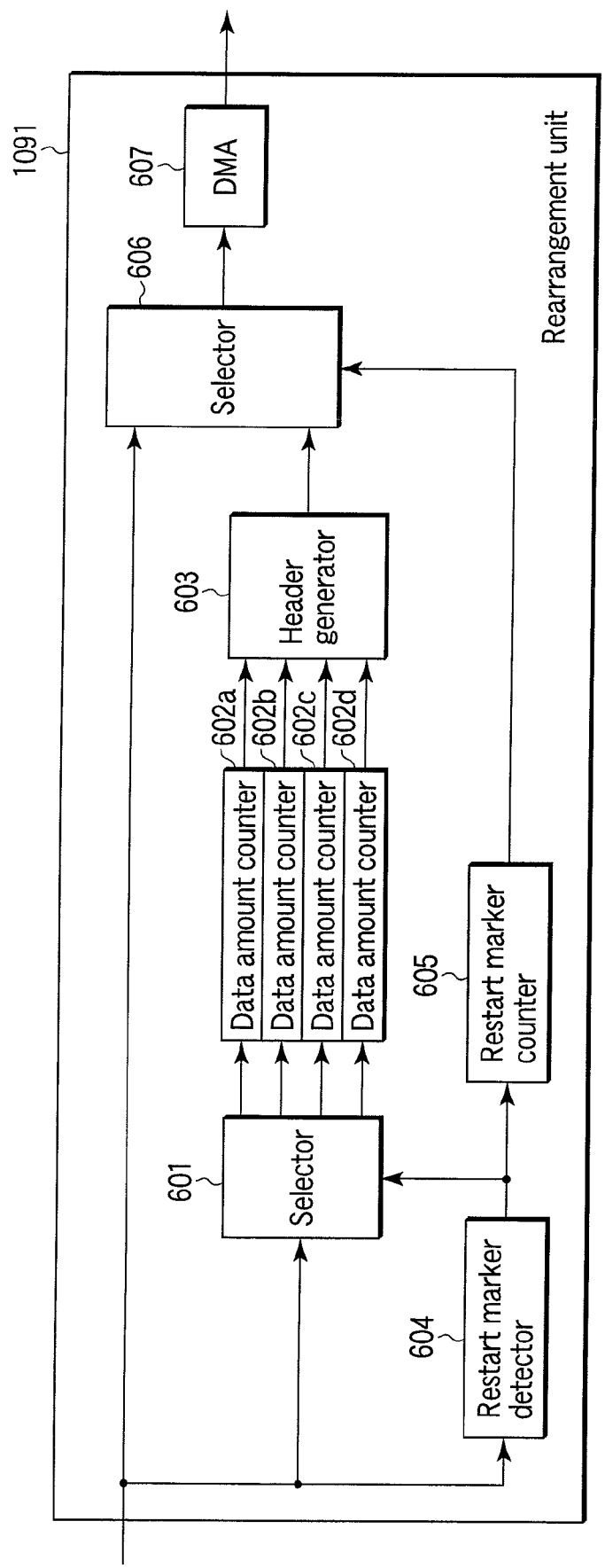
FIG. 17 is a diagram showing a detailed configuration of the rearrangement unit 1091.

First, the rearrangement unit 1091 is explained in detail. FIG. 17 is a diagram showing a detailed configuration of the rearrangement unit 1091. As shown in FIG. 17, the rearrangement unit 1091 includes a selector 601, data amount counters 602a to 602d, a header generator 603, a restart marker detector 604, a restart marker counter 605, a selector 606 and a DMA 607.

The selector 601 selects any of the data amount counters 602a to 602d each time the restart marker RSTm is detected by the restart marker detector 604, and the compressed image data processed by the JPEG processing unit 108 is input to the selected data amount counter.

The data amount counters 602a to 602d are arranged in the same number as the number of the compression unit lines in the division block line (four in the case shown in FIGS. 13A to 13C), and count the compression unit line data amount by counting the amount of the compressed image data input through the selector 601.

The header generator 603 generates the rearrangement header data. As described above, the number of the compression units along the rows and the number of the compression units along the columns in the rearrangement header data are determined by the manner in which the division block line is divided. Registers to set therein the number of the compression units along the rows and the number of the compression units along the columns are arranged in the header generator 603, and the number of the compression units along the rows and the number of the compression units along the columns are set in the registers by the CPU 112 in advance. As a result, at the time of generating the rearrangement header data, the number of the compression units along the rows and the number of the compression units along the columns can be acquired by referring to the register setting. Also, the compression unit line data amount can be acquired as the result of the counting operation in the data amount counters 602a to 602d.

The restart marker detector 604 detects the restart marker RSTm inserted at the tail end of the compressed image data for each compression unit input from the JPEG processing unit 108. The restart marker counter 605 counts up each time the restart marker RSTm is detected by the restart marker detector 604 thereby to count the number of the restart markers inserted in the compressed image data.

In the selector 606, the rearrangement header data generated by the header generator 603 and the compressed image data input from the JPEG processing unit 108 are selectively output to the DMA (direct memory access) 607 in accordance with the count on the restart marker counter 605. In the DMA 607, the rearrangement header data generated by the header generator 603 and the compressed image data input from the selector 606 are written in the frame memory 105.

The operation of the rearrangement unit 1091 shown in FIG. 17 is explained. The compressed image data for each compression unit processed by the JPEG processing unit 108 are input to the selectors 601, 606 and the restart marker detector 604, respectively. The selector 606 first selects the compressed image data processed in the JPEG processing unit 108. As a result, the compressed image data processed in the JPEG processing unit 108 are output to the DMA 607 through the selector 606. Thus, the compressed image data are sequentially written in the frame memory 105 by the DMA 607.

Also, the selector 601 first selects the data amount counter 602a. Therefore, the compressed image data processed in the JPEG processing unit 108 are input to the data amount counter 602a through the selector 601, and the data amount is counted by the data amount counter 602a.

Once the restart marker detector 604 detects the restart marker inserted in the compressed image data, the selector 601 selects the data amount counter 602b. The compressed image data processed in the JPEG processing unit 108 are input to the data amount counter 602*b* through the selector 601, and the data amount is counted by the data amount counter 602*b*.

In the subsequent operation, the selector 601 sequentially switches the data amount counter each time the restart marker is detected. Specifically, the data amount is counted by another data amount counter each time the restart marker is detected. Take the division block line 1-1 as an example. From the JPEG processing unit 108, the compressed image data of the compression units 1-1, 1-2, 1-3, 1-4, 2-1, 2-2, ..., M-1, M-2, M-3, M-4 are input in that order. The data amount counted by the data amount counter 602*a* (the compression unit line data amount), therefore, is the sum of the compression units 1-1, 2-1, ..., M-1. Also, the data amount counted by the data amount counter 602*b* is the sum of the compression units 1-2, 2-2, ..., M-2. Similarly, the data amount counted by the data amount counter 602*c* is the sum of the compression units 1-3, 2-3, ..., M-3, and the data amount counted by the data amount counter 602*d* is the sum of the compression units 1-4, 2-4, ..., M-4.

Also, the restart marker counter 605 which counts the number of the restart markers switches the selector 606 in such a manner that the rearrangement header data generated by the header generator 603 is selected at the time point when the count coincides with the number of the compression units making up the division block line. As a result, the rearrangement header data generated by the header generator 603 is output to the DMA 607 through the selector 606. In this way, the rearrangement header data are sequentially written in the frame memory 105 by the DMA 607.

The series of operations described above ends the process for one division block line. The same series of operations are performed also for each of the subsequent division block lines. By doing so, the compressed image data are written in the frame memory 105 as shown in FIG. 15.

Figure 18:
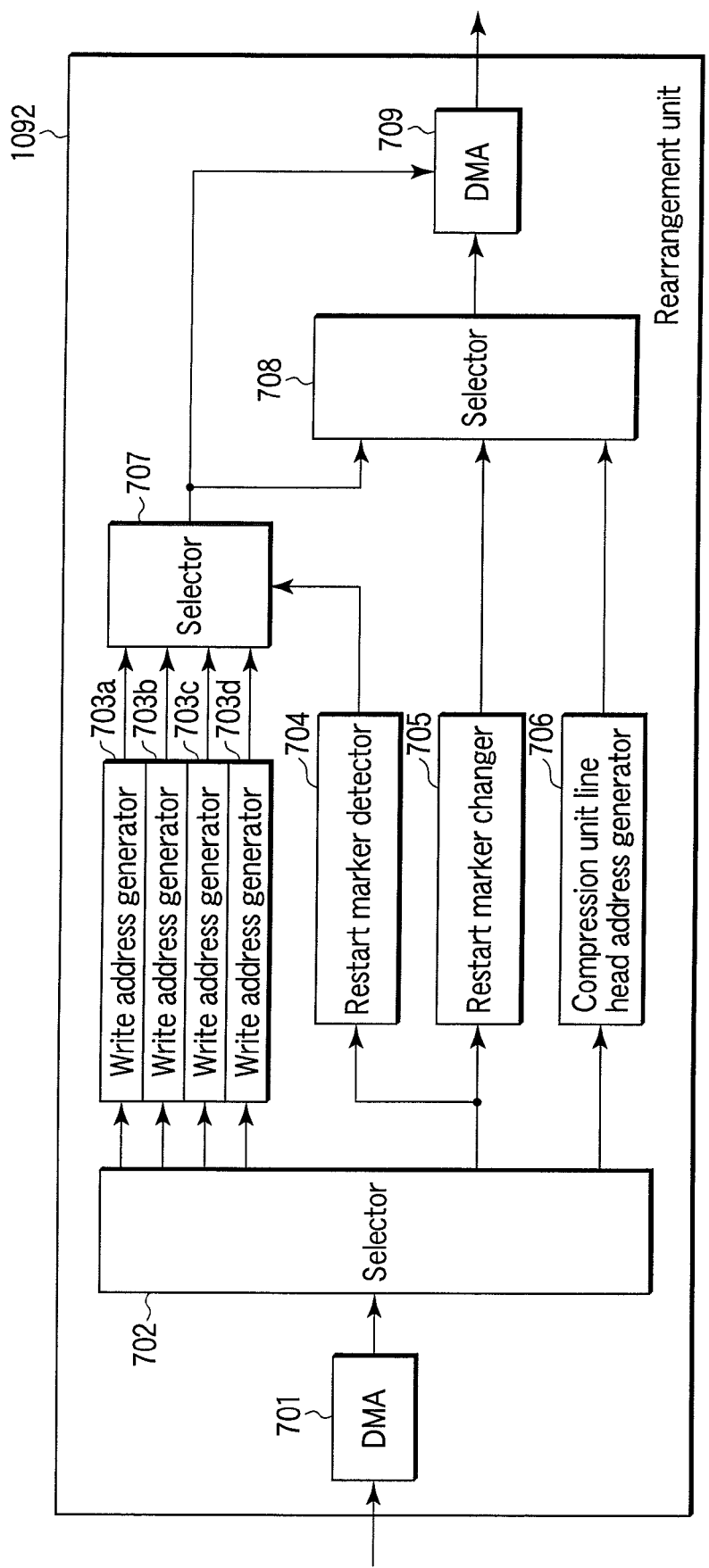
FIG. 18 is a diagram showing a detailed configuration of a rearrangement unit 1092.

Next, the rearrangement unit 1092 is explained in detail. FIG. 18 is a diagram showing the detailed configuration of the rearrangement unit 1092. As shown in FIG. 18, the rearrangement unit 1092 includes a DMA 701, a selector 702, write address generators 703*a* to 703*d*, a restart marker detector 704, a restart marker changer 705, a compression unit line head address generator 706, a selectors 707, a selector 708 and a DMA 709.

The DMA 701 reads the rearrangement header data and the compressed image data for each compression unit from the frame memory 105. In the selector 702, the rearrangement header data and the compressed image data for each compression unit read through the DMA 701 are output selectively to the write address generators 703*a* to 703*d*, the restart marker detector 704, the restart marker changer 705 and the compression unit line head address generator 706.

The write address generators 703*a* to 703*d* generate the write address for writing the compressed image data for each compression unit back into the frame memory 105, and outputs the write address to the selector 707 together with the corresponding compressed image data.

The restart marker detector 704 detects the restart marker inserted at the tail end of the compressed image data for each compression unit. The restart marker changer 705 changes the restart marker number in accordance with the result of generating the write address by the write address generators 703*a* to 703*d*.

The compression unit line head address generator 706 generates the head address after rearrangement for the compression unit line from the data amount of the compression unit line recorded in the rearrangement header data.

In the selector 707, the write address generated by any of the write address generators 703*a* to 703*d* is output to the DMA 709 each time the restart marker is detected by the restart marker detector 704, while at the same time outputting the data corresponding to the address generated by the write address generators 703*a* to 703*d* to the DMA 709.

The selector 708 selectively outputs to the DMA 709 the compression unit line head address input from the selector 707, the compressed image data with the restart marker number changed by the restart marker changer 705 and the head address after rearrangement generated in the compression unit line head address generator 706.

The DMA 709 carries out the DMA transfer to write in the frame memory 105 the head address after rearrangement generated by the compression unit line head address generator 706, the DMA transfer to write in the frame memory 105 the compressed image data for each compression unit corresponding to the frame memory address generated by the write address generators 703*a* to 703*d* (the compressed image data output from the restart marker changer 705 with the restart marker number rewritten), and the DMA transfer to overwrite on the frame memory 105 the address generated by the write address generators 703*a* to 703*d* as a new head address after rearrangement.

The operation of the rearrangement unit 1092 shown in FIG. 18 is explained with reference to the flowchart of FIG. 19. First, the head address after rearrangement for each compression unit line is generated from the data amount of the compression unit line recorded in the rearrangement header data (step S101).

The selectors 702, 708 are set to select the compression unit line head address generator 706 in step S101. After that, the rearrangement header data written in the frame memory 105 is read through the DMA 701. As a result, the rearrangement header data read through the DMA 701 is output to the compression unit line head address generator 706. The compression unit line head address generator 706 sequentially calculates the head address of the compression unit lines using the rearrangement header data. The compression unit line head address generator 706, after calculating the head address of the compression unit line, sequentially writes the calculated head address of the compression unit line in the frame memory 105 through the DMA 709.

An example of the method of calculating the compression unit head address is explained. By way of explanation, the compression unit line head addresses are designated as 1, 2, ..., V from the compression unit line head address corresponding to the compression unit line at the upper end of FIGS. 13A to 13C. First, assume that the compression unit line head address 1 corresponding to the upper end of FIGS. 13A to 13C is the head address of the compressed image data after rearrangement and set in the register by the CPU 112. Also, the compression unit line head address V (V>1) on line V in FIGS. 13A to 13C is calculated according to the equation described below.

(Compression unit line head address *V*-1)+(total compression unit line data amount on line *V*)

Then, the compression unit line head address 2, for example, is given as (compression unit line head address 1)+(compression unit line data amount 1 on division block line 1-1)+(compression unit line data amount 1 on division block line 2-1)+(compression unit line data amount 1 on division block line 3-1). Also, the compression unit line head address 3 is given as (compression unit line head address 2)+(compression unit line data amount 2 on division block line 1-1)+(compression unit line data amount 2 on division block line 2-1)+(compression unit line data amount 2 on division block line 3-1).

Next, the compression unit line head address stored in the frame memory 105 is read and the write address generators 703*a* to 703*d* are initialized (step S102).

In step S102, the selector 702 is set to sequentially select the write address generators 703*a* to 703*d*. After that, the compression unit head address corresponding to one block line (four lines in the case shown in FIGS. 11A to 11C) is read through the DMA 701. As a result, the value held in the write address generators 703*a* to 703*d* is overwritten by the compression unit line head address read from the frame memory 105 and the write address generators 703*a* to 703*d* are initialized.

Next, the compressed image data is read from the frame memory 105 and written back into the frame memory 105 in such a manner as to be distributed in accordance with the compression unit line head address held in the write address generators 703*a* to 703*d* (step S103).

In step S103, the selector 707 is set to select the write address generator 703*a*. Also, the selector 702 is set to select the restart marker detector 704 and the restart marker changer 705. After that, the compressed image data of the compression unit is sequentially read through the DMA 701. In the process, the compressed image data are read in the order of storage in the frame memory 105 (compression units 1-1, 1-2, . . . ). As a result, the compressed image data of the compression unit 1-1 read through the DMA 701 is sequentially written from the compression unit line head address 1 of the frame memory 105. At the end of writing the compressed image data of the compression unit 1-1, the restart marker is detected by the restart marker detector 704. At this point, the selector 707 is set to select the write address generator 703*b*. As a result, the compressed image data of the compression unit 1-2 read through the DMA 701 is sequentially written from the compression unit line head address 2 of the frame memory 105. After that, the selector 707 is set to select the write address generators 703*c*, 703*d* sequentially each time the restart marker is detected by the restart marker detector 704. In this way, the compressed image data of the compression unit 1-3 is written from the compression unit line head address 3 of the frame memory 105, and at the same time the compressed image data of the compression unit 1-4 is written from the compression unit line head address 4 of the frame memory 105.

Also, at the time of writing the compressed image data into the frame memory 105, the restart marker changer 705 changes the restart marker number. This is in order to make the restart marker numbers serial after rearrangement of the compressed image data. Incidentally, in the first step of changing the restart marker number, the numbers are changed so that the restart marker numbers of the compression units (1-1, 2-1, 3-1, . . . , H-1) corresponding to the first row in the compressed image data after rearrangement may be serial. Also, the restart marker numbers are changed in such a manner that the restart marker numbers of the compression units (1-2, 2-2, 3-2, . . . , H-2) corresponding to the second row may be continued from the last compression unit on the first row. This is also the case with the third and subsequent rows.

After completely writing the compressed image data on one division block line back into the frame memory 105, the present values of the write address generators 703*a* to 703*d* (these values constitute the head address for writing back the next division block line) are output from the DMA 709. As a result, the compression unit line head address already stored in the frame memory 105 is overwritten (step S104).

Figure 20:
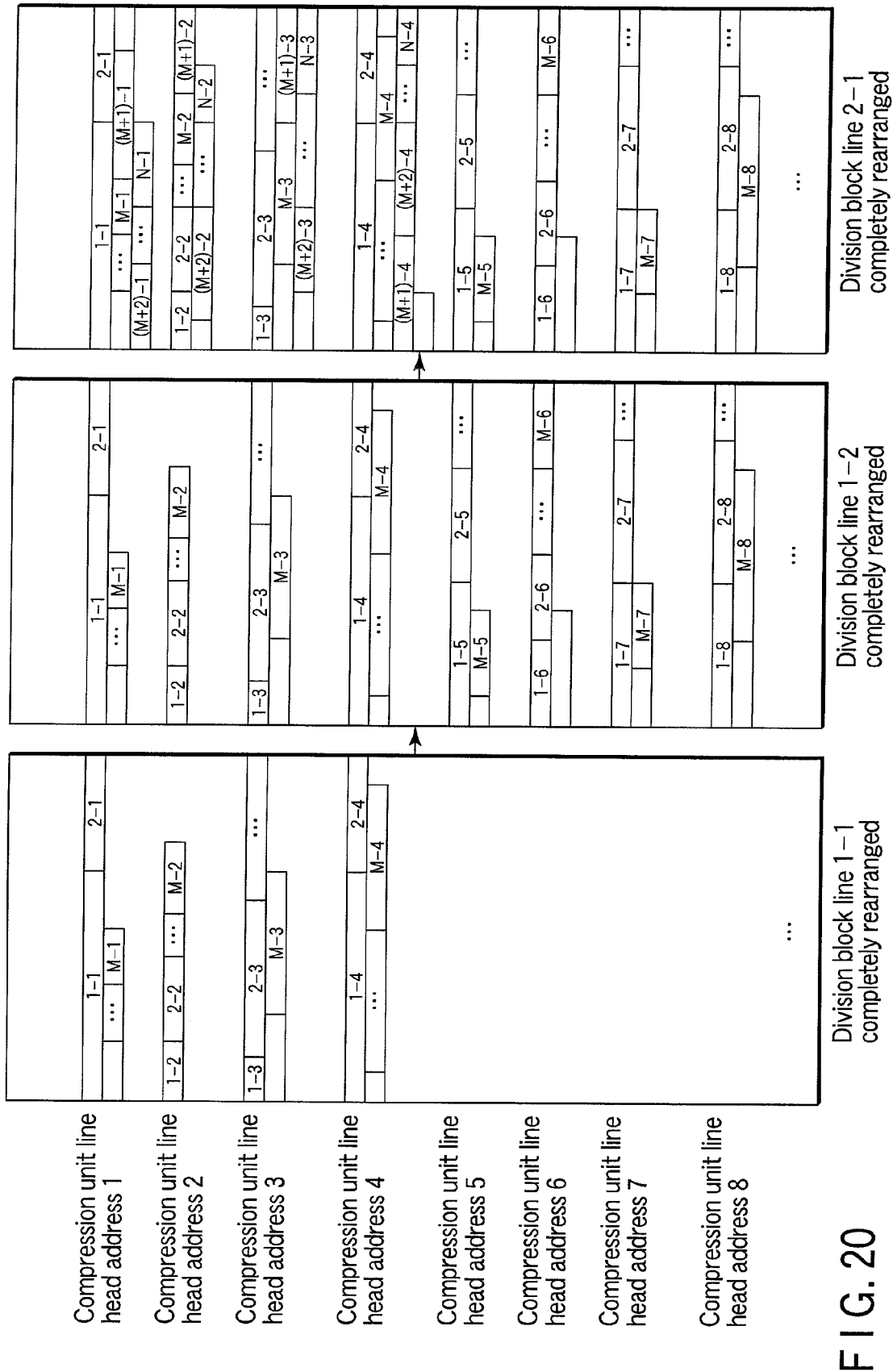
FIG. 20 is a diagram showing the state of the compressed image data on the frame memory 105 before complete rearrangement of the division block line 2-1.

Next, step S105 determines whether the compressed image data of all the division block lines have been written back or not. In the case where step S105 determines that the compressed image data of all the division block lines have yet to be written back, the process returns to step S102. In this case, the process is executed on the next division block line. After the process on the division block line 1-1, for example, the process is executed on the next lower division block line 1-2. In this process, the write address generators 703*a* to 703*d* are initialized by the compression unit line head addresses 5 to 8 and the compressed image data are written back. After completion of the process on the division block line 1-2, the process is executed on the next lower division block line 1-3. In this process, the write address generators 703*a* to 703*d* are initialized by the compression unit line head addresses 9 to 12 and the compressed image data are written back. After completion of the process to the lowest division block line, the process is executed on the division block line 2-1 at the upper end of the right adjacent column. The compression unit line head addresses 1 to 4 read in the process are updated at the time of executing the process on the division block line 1-1. Therefore, the division block line 2-1 is arranged in position adjacently to the right of the division block line 1-1. FIG. 20 shows the state of the compressed image data on the frame memory 105 before complete rearrangement of the division block line 2-1. As shown in FIG. 20, the compressed image data of the division block line 1-2 adjacent to the division block line 1-1 along the columns is sequentially written from the compression unit line head addresses 5 to 8 different from the division block line 1-1. In contrast, the compressed image data of the division block line 2-1 adjacent to the division block line 1-1 along the rows is sequentially written continuously from the division block line 1-1.

Figure 19:
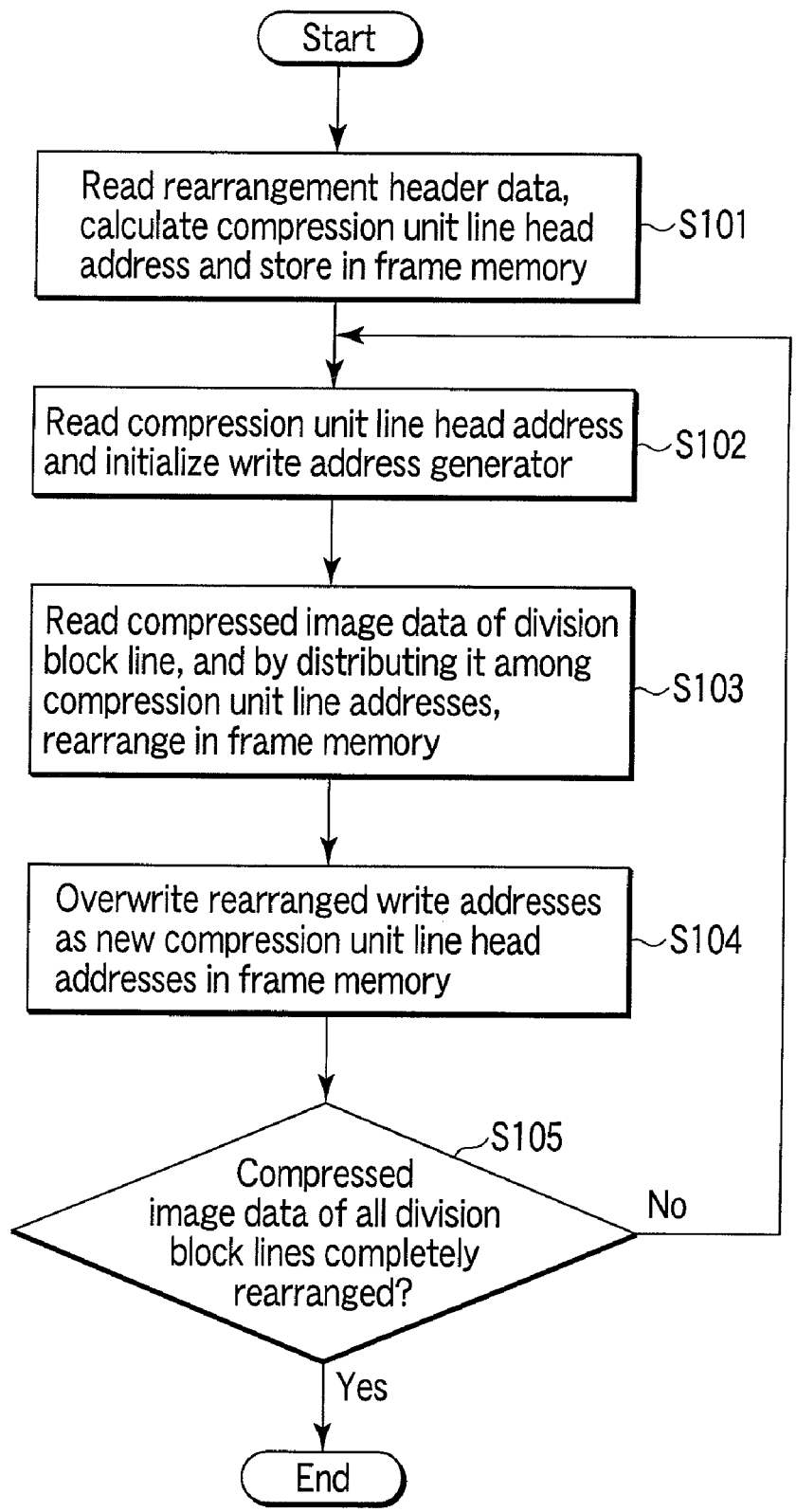
FIG. 19 is a flowchart showing the operation of the rearrangement unit 1092.

Also, in the case where step S105 determines that the compressed image data of all the division block lines are written back, the process shown in FIG. 19 is ended.

As explained above, according to the second embodiment, the image data of the margin portion is not required to be read at the time of reading the compressed image data of each block line, nor is it required to execute the process of overlapping the image data of the margin portion. Also, by dividing one block line into a plurality of division block lines, the amount of the image data of the margin portion required for image processing can be reduced. As a result, the capacity of the margin storing buffer can be reduced as compared with the case in which the image process is executed in units of block line.

On the other hand, as the result of the process execution in units of division block line, the compressed image data after compression are arranged in the order unsuitable for reproduction. According to this embodiment, however, the compressed image data are rearranged by the JPEG rearrangement unit 109, and therefore, can be recorded in the recording medium 111 in a properly reproducible state.

In the example shown in FIGS. 13A to 13C, the process is executed for each of the three equal division block lines into which one block line is divided along the rows. The number of the divisions, however, is not limited to three, but may alternatively be two, four or more.

Figure 21:
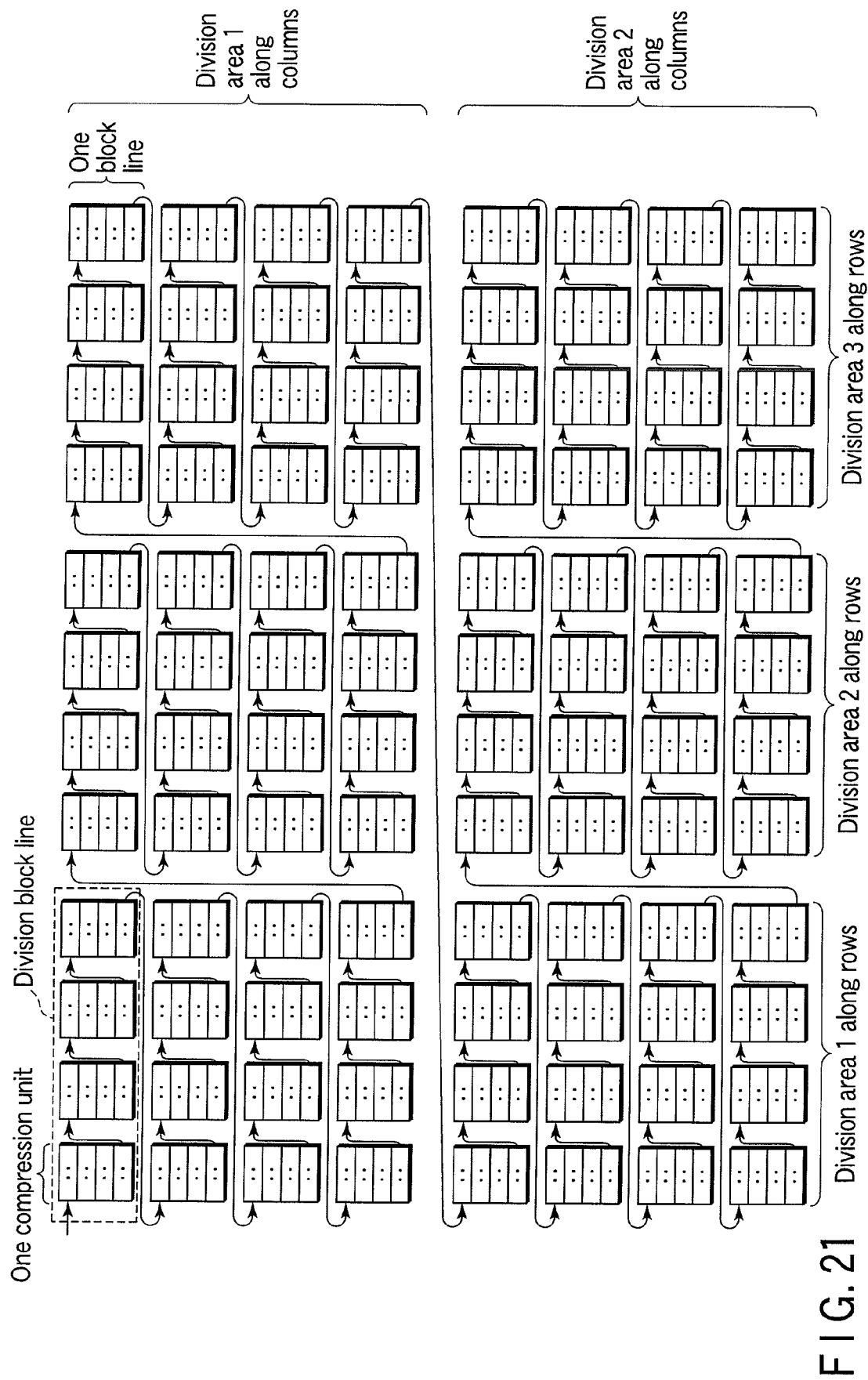
FIG. 21 is a diagram showing a modification in which the image data is processed along the columns as well as the rows.

Also, as shown in FIG. 21, the image data of one frame may alternatively be divided further along the columns. According to the second embodiment described above, the rearrangement is carried out after the image processing and compression of one frame are completed. By executing the process as shown in FIG. 21, on the other hand, the rearrangement is made possible for each division area along the columns. As a result, such a process becomes possible that the division area 1 along the columns is rearranged upon complete compression of the division area 1 along the columns or that the division area 2 along the columns is rearranged upon complete compression of the division area 2 along the columns. In such a case, the frame memory 105 is required to have only the capacity sufficient to store the compressed image data before rearrangement in the division area 1 along the columns or the division area 2 along the columns, whichever is greater. As a result, the capacity of the frame memory 105 can be reduced more than in the case where the rearrangement is made after processing one frame. Also, the time delay from the start of the compression process to the complete rearrangement can be reduced.

In the example shown in FIG. 1, the plurality of the image processors in the image processing unit 106 each have a corresponding margin storing buffer. As shown by an example in FIG. 17, on the other hand, only one margin storing buffer 106b having the capacity at least equal to the total capacity of the margin storing buffers 1061b, 1062b, . . . , 106nb may be provided, and the data may be transferred between the margin storing buffer 106b and each image processor through a bus 1063. Generally, the area efficiency is known to be higher in the case where one memory of a large capacity is arranged than in the case where a plurality of small-capacity memories are arranged. According to the modification, therefore, the area of the margin storing buffer can be reduced.

In the second embodiment, the configuration shown in FIG. 9 according to a modification of the first embodiment may be employed. Also, the method of the second embodiment can be used for the distortion correction process.

Third Embodiment

Now, a third embodiment of the invention is explained. The configuration of the image processing apparatus according to the third embodiment is identical with the modification of the first embodiment shown in FIG. 9. Also, the image processing unit 106 according to the third embodiment reads the image data from the frame memory 105 in units of block line shown in FIG. 2, for example.

Also, according to the third embodiment, an operation unit 113 has the function as a setting unit to set the operation mode of the imaging apparatus. The CPU 112 has an additional function as a controller to select an image processor corresponding to the operation mode set through the operation unit 113, among the plurality of the image processors 1061a to 106na in the image processing unit 106, when the operation mode of the imaging apparatus is set by the operation unit 113.

Figure 22:
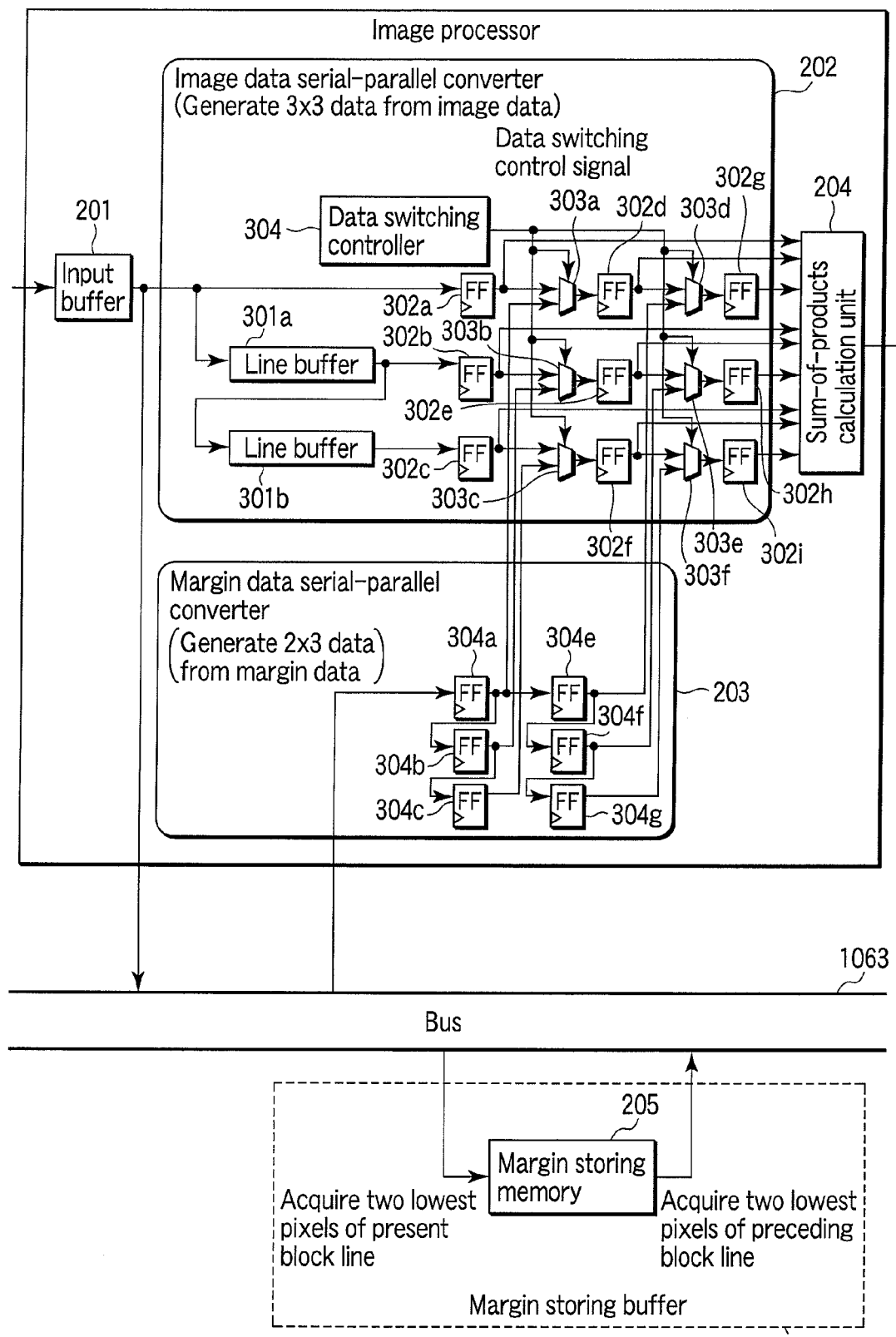
FIG. 22 is a diagram showing a detailed configuration of each image processor and a corresponding margin storing buffer 106b of the image processing unit 106 according to a third embodiment of the invention.

FIG. 22 is a diagram showing a detailed configuration of one of the image processors and the margin storing buffer 106b of the image processing unit 106. The configuration shown in FIG. 22 is similar to the configuration shown in FIG. 5 except that in the configuration shown in FIG. 22, the image processor and the margin storing buffer 106b are connected to each other through a bus 1063.

Next, the operation to share the margin storing buffer 106b according to the third embodiment is explained. According to this embodiment, the margin storing buffer 106b is connected to the plurality of the image processors 1061a to 106na through the bus 1063 and thus shared by the plurality of the image processors 1061a to 106na. In this case, the margin storing memory 205 of the margin storing buffer 106b is required to store the margin image data required by each of the plurality of the image processors 1061a to 106na.

Many common imaging apparatuses including the digital camera have a plurality of operation modes such as the high-sensitivity imaging mode and the movie imaging mode. The plurality of these operation modes are likely to require different image processing. Further, the total value of the margin image data may vary depending on the particular image processing.

In view of this, according to this embodiment, the capacity of the margin storing memory 205 is set in accordance with the image processing operation considered to have the largest total value of the margin image data among the image processing operations adapted to be performed in the imaging apparatus.

Assume, for example, that the imaging apparatus according to this embodiment has four operation modes including the normal imaging mode, high-sensitivity imaging mode, the reduction image recording mode and the imaging mode with distortion correction function, and that different image processing operations are performed in these operation modes. An example of the relation between the contents of image processing corresponding to each operation mode and the amount of the image data in the margin portion required for each image processing operation is shown in FIG. 23.

In FIG. 23, the normal imaging mode is the operation mode in which the normal imaging operation is performed without any special processing. In the normal imaging mode, the image data obtained by operating the image sensor 102 while at the same time controlling the aperture and the shutter not shown, and then the image data is recorded in the recording medium 111 after being processed in the image processing unit 106 and the JPEG processing unit 108. The image processing in the normal imaging mode is assumed to further include the noise removal process after the YC conversion process. Also, as shown in FIG. 23, the YC conversion process is assumed to require the margin image data A, and the noise removal process is assumed to require the margin image data B. As described above, in the case where a plurality of image processing operations are directly connected to each other, the total margin is the sum of the margins for the respective image processing operations. In the normal imaging mode, therefore, the margin image data of (A+B) is required.

The high-sensitivity imaging mode, on the other hand, is similar to the normal imaging mode in the basic flow of the imaging operations. In the high-sensitivity imaging mode, however, unlike in the normal imaging mode, the sensitivity of the image sensor 102 (the amplification factor of the image signal output from the image sensor 102) is set higher than in the normal imaging mode. In the case where the sensitivity of the image sensor 102 is increased, a greater noise is generated than in the normal imaging mode, and therefore, a stronger noise removing process is desired than in the normal image mode. With the increase in the strong noise removing process, the amount of the margin image data required for the process is generally increased accordingly. In FIG. 23, the amount of the margin image data required for the strong noise removing process is set at B' (B'>B).

The reduction image recording mode is different from the normal imaging mode in that the image data obtained from the image sensor 102 is recorded in the recording medium 111 with a lower resolution (with a reduced image data size) in the image processing operation of the image processing unit 106. In the case of FIG. 23, however, the LPF process is executed before the reduction process. This LPF process is intended to prevent the aliasing distortion which otherwise might be caused by the size reduction process. Incidentally, as shown in FIG. 23, the LPF process requires the margin image data C, and the size reduction process requires the margin image data D. In this case, assume that A+B'>A+B+C+D.

The imaging mode with the distortion correction function is different from the normal imaging mode in that the image data is recorded in the recording medium 111 after correcting the distortion caused by the aberration of the lens 101 in the image processing operation of the image processing unit 106. Generally, the distortion correction process requires a larger margin image data than the YC conversion process, the noise removing process, the LPF process and the size reduction process. In the case of FIG. 23, the amount of the margin image data required for the distortion correction process is assumed to be E. In this case, assume that A+B+E>A+B'.

In the case of FIG. 23, the maximum amount of the margin image data which may occur in each image processor is given as A+B'+C+E. In the absence of the image processing which generates such a margin image data, however, the margin storing memory 205 sufficiently has a capacity adapted to store the margin image data A+B+E required for the imaging mode with the distortion correction function. Also, the image processing unit 106 sufficiently has four types of image processors 1061a to 1064a.

FIGS. 24A to 24D are diagrams showing the state of the margin storing memory 205 in each operation mode in the case where the capacity of the margin storing memory 205 is A+B+E.

FIG. 24A shows the case of the normal imaging mode. In this case, the margin image data A required for the YC conversion process in the image processor 1061a and the margin image data B required for the noise removing process in the image processor 1062a are stored at the same time in the margin storing memory 205. The area remaining after storing the margin image data A and the margin image data B is not used.

FIG. 24B shows the case of the high-sensitivity imaging mode. In this case, the margin image data A required for the YC conversion process in the image processor 1061a and the margin image data B' required for the strong noise removing process in the image processor 1062a are stored at the same time in the margin storing memory 205. The area remaining after storing the margin image data A and the margin image data B' is not used.

FIG. 24C shows the case of the reduction image recording mode. In this case, the margin image data A required for the YC conversion process in the image processor 1061a, the margin image data B required for the noise removing process in the image processor 1062a, the margin image data C required for the LPF process in the image processor 1063a and the margin image data D required for the reduction process in the image processor 1064a are stored in the margin storing memory 205 at the same time. The area remaining after storing the margin image data A, B, C and D is not used.

FIG. 24D shows the case of the imaging mode with the distortion correction function. In this case, the margin image data A required for the YC conversion process in the image processor 1061a, the margin image data B required for the noise removing process in the image processor 1062a and the margin image data E required for the distortion correction process in the image processor 1064a are stored in the margin storing memory 205 at the same time. As shown in FIG. 24D, the entire area in the margin storing memory 205 is used in the imaging mode with the distortion correction function.

The margin storing memory 205 used in the margin storing buffer 106b as described above may be any one of high integration memories including the eDRAM (Embedded DRAM), MRAM (Magnetoresistive RAM), FeRAM (Ferroelectric RAM), ReRAM (Resistance RAM), PRAM (Phase change RAM), 1T-SRAM (One Transistor SRAM), Z-RAM (Zero Capacitor RAM) and TTRAM (Twin Transistor RAM).

As explained above, according to the third embodiment, the image data of the margin portion is required neither to be read out nor to be overlapped at the time of reading the image data of each block line.

Further, since the image data of the margin portion is stored in the margin storing buffer 106b, the band of the bus 104 is not overburdened even in the case where the number of the image processors coupled directly thereto is increased.

Also, in view of the fact that the capacity of the margin storing memory 205 is set in accordance with the different image processing contents for different operation modes of the imaging apparatus, the capacity of the margin storing memory 205 of the margin storing buffer 106b can be minimized.

In the embodiments described above, the four operation modes including the normal imaging mode, the high-sensitivity imaging mode, the reduction image recording mode and the imaging mode with the distortion correction function are employed as an example. Nevertheless, the technique according to the third embodiment is applicable also to various cases in which a plurality of image processing operations with different amounts of the margin image data are used at the same time.

In the third embodiment described above, the process may be executed for each image data of the division block line as in the second embodiment. Taking the image processing efficiency into consideration, the amount of the image data input at a time to the image processing unit 106 is desirably great as far as possible. In order to reduce the capacity of the margin storing memory 205, on the other hand, the amount of the image data input to the image processing unit 106 at a time should be reduced as far as possible. Taking the tradeoff between the image processing efficiency and the memory capacity into consideration, therefore, the capacity of the margin storing memory 205 may be set to an optimum value, and only in the case where the operation mode is set which requires the margin image data exceeding the set capacity of the margin storing memory 205, the process may be executed for each division block line.

Also, in the case where the margin image data exceeding the optimum value is required, another alternative process described below may be employed. Specifically, according to this modification, in the case where the operation mode is set in which the margin image data exceeding the set capacity of the margin storing memory 205 is required, the excess of the margin image data above the set capacity of the margin storing memory 205 (the image data of that portion hatched in FIG. 6 which cannot be stored in the margin storing memory 205) is read in overlapped fashion from the frame memory 105 at the time of reading the image data of each block line.

This modification is specifically explained below with reference to FIGS. 25A to 25D. Incidentally, the operation modes of the imaging apparatus are assumed to involve, like in the third embodiment described above, the normal imaging mode, the high-sensitivity imaging mode, the reduction image recording mode and the imaging mode with the distortion correction function. Also, assume that the set capacity F of the margin storing memory 205 is substantially sufficient to store the margin image data required for the normal imaging mode and the reduction image recording mode (A+B+C+D<set capacity<A+B').

Figures 25A, 25B, 25C, 25D:
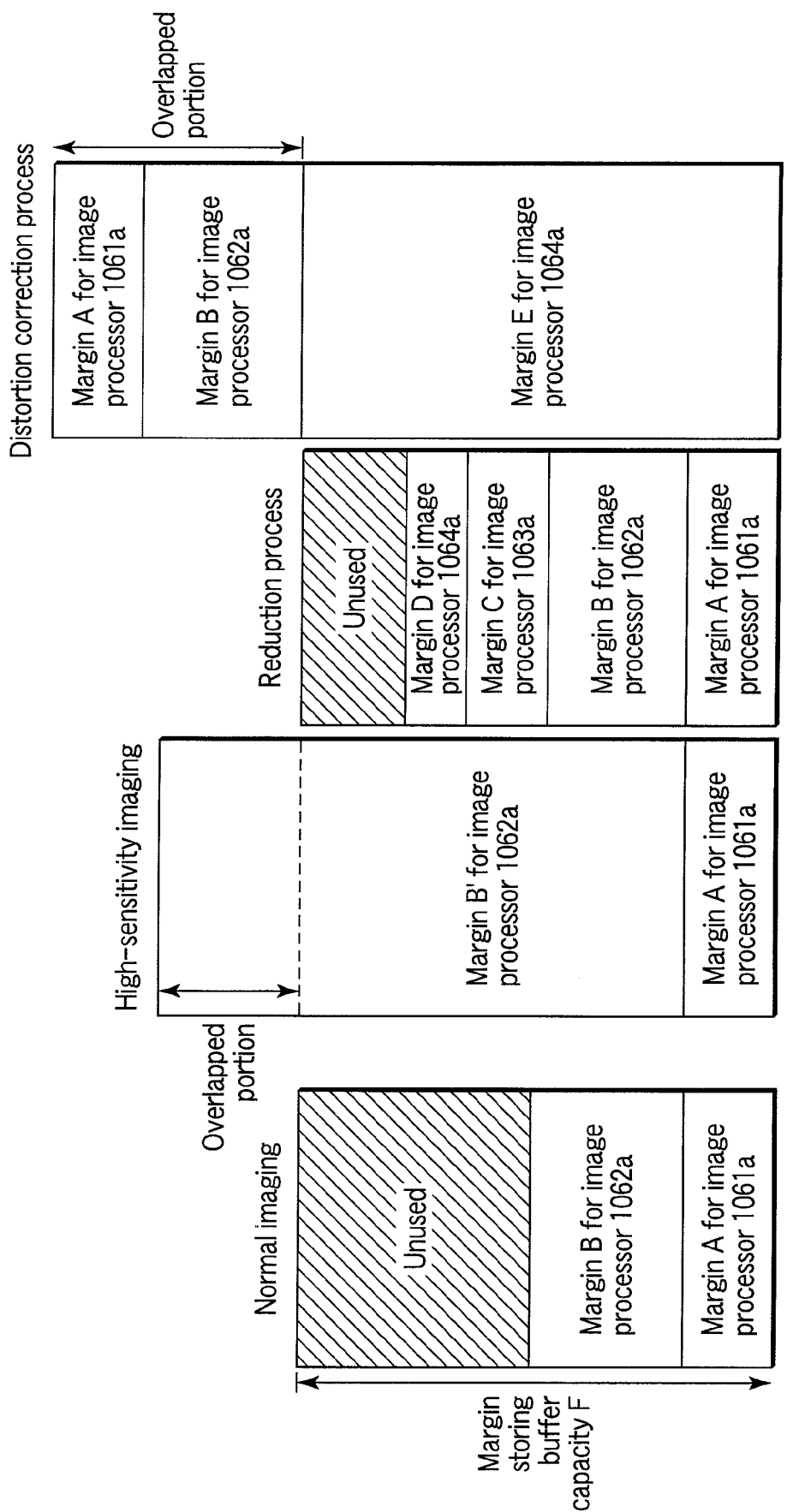
FIGS. 25A, 25B, 25C and 25D are diagrams for explaining a modification in which the image data are read in overlapped fashion.

The set capacity F of the margin storing memory 205 is larger than A+B+C+D, and therefore, as far as the normal imaging mode shown in FIG. 25A and the reduction image recording mode shown in FIG. 25C are concerned, all the margin image data can be stored in the margin storing memory 205.

In the high-sensitivity imaging mode shown in FIG. 25B and the imaging mode with the distortion correction function shown in FIG. 25D, on the other hand, the portion indicated by arrow cannot be stored in the margin storing memory 205. In order to allow the portion indicated by arrow without being stored in the margin storing memory 205, therefore, the image data is read extraneously from the frame memory 105. In the high-sensitivity imaging mode shown in FIG. 25B, the process is executed by the image processor 1062a using a combination of the margin image data stored in the margin storing memory 205 and the margin image data extraneously read from the frame memory 105. Similarly, in the imaging mode with the distortion correction function shown in FIG. 25D, the process is executed by the image processors 1061a, 1062a using the margin image data extraneously read from the frame memory 105.

The modification described above can also reduce the capacity of the margin storing memory 205 as compared with the case in which all the margin image data required in the image processing unit 106 are stored.

Incidentally, the modification using the process for each division block line and the modification using the operation of reading the overlapped portion of the margin image data may be combined with each other.

Fourth Embodiment

Next, a fourth embodiment of the invention is explained. In the third embodiment explained above, one margin storing buffer 106b is provided for the plurality of the image processors 1061a to 106na arranged in the image processing unit 106. According to the second embodiment, in contrast, a plurality of the margin storing buffers are provided for the plurality of the image processors 1061a to 106na.

FIG. 26 is a diagram showing the configuration of an imaging apparatus having an image processing apparatus according to the fourth embodiment of the invention. Incidentally, the configuration shown in FIG. 26 is similar to that shown in FIG. 9 except for the imaging processing unit 106, and therefore, not described any more.

The image processing unit 106 is configured of a plurality of the image processors 1061a, 1062a, . . . , 106na directly connected. The plurality of these image processors 1061a, 1062a, . . . , 106na are connected to a plurality of the margin storing buffers 1061b, 1062b, . . . , 106nb through a switch 1064. In this configuration, the image processor 1061a and the margin storing buffer 1061b correspond to each other, and the margin storing buffer 1061b has a capacity sufficient to store the margin image data required for the image processing in the image processor 1061a. Similarly, the image processor 1062a corresponds to the margin storing buffer 1062b, the image processor 1063a corresponds to the margin storing buffer 1063b, . . . , and the image processor 106na corresponds to the margin storing buffer 106nb.

The switch 1064 is for selecting any of the margin storing buffers used at the time of storing the margin image data in each of the plurality of the image processors 1061a, 1062a, . . . , 106na.

In the normal imaging mode shown in FIG. 24A, for example, the image processing is performed using the image processor 1061a and the image processor 1062a. In this case, the switch 1064 is set to connect the image processor 1061a and the margin storing buffer 1061b to each other on the one hand and the image processor 1062a and the margin storing buffer 1062b to each other on the other hand. Also, in the high-sensitivity imaging mode shown in FIG. 24B, the image processing is performed using the image processor 1061a and the image processor 1062a. In this case, too, the switch 1064 is set to connect the image processor 1061a and the margin storing buffer 1061b to each other on the one hand, and the image processor 1062a and the margin storing buffer 1062b to each other on the other hand. This is also the case with the reduction image recording mode shown in FIG. 24C, and the imaging mode with the distortion correction function shown in FIG. 24D.

With the configuration shown in FIG. 26, one image processor may occupy a plurality of margin storing buffers. In the imaging mode with the distortion correction function, for example, the image processing is performed using the image processor 1061a, the image processor 1062a and the image processor 1064a. In the distortion correction process in the image processor 1064a, a large margin image data is required to be stored. Thus, the switch 1064 is set to connect the image processor 1064a and the margin storing buffers 1064b, 1063b to each other. As a result, the margin image data required for the image processing in the image processor 1064a can be stored in the margin storing buffers 1064b, 1063b. By making it possible for one image processor to occupy a plurality of margin storing buffers in this way, the capacity of the margin storing memory used for each margin storing buffer can be reduced.

The imaging apparatus according to the third and fourth embodiments is an example in which the lens 101 is not interchangeable. In the imaging apparatus having the lens 101 of interchangeable type, on the other hand, the amount of the margin image data required for distortion correction in the image processing unit 106 is calculated based on the information on the lens 101 obtained by communication between the interchangeable lens and the imaging apparatus body, and in accordance with the result of this calculation, the method in which the margin image data is stored in the margin storing buffer may be changed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus which executes a plurality of image processing operations on an input image data picked up and stored in a frame memory, comprising:
   a plurality of image processors which read the input image data from the frame memory for each image data of a plurality of block lines each having a first number of pixels along the columns and a second number of pixels along the rows, and sequentially executing at least one of a spatial filter process and a distortion correction process on the image data of the block lines; and
   a margin storing buffer which, among the image data of the present block line input to each of the plurality of the image processors, stores the image data of the margin portion used also in the image processing of the image data of the next block line,
   wherein each of the plurality of the image processors, at the time of image processing on the image data of the next block line, performs the image processing on an image data including the image data of the present block line and the image data of the margin portion, and wherein each of the margin storing buffers is arranged with a corresponding one of the plurality of the image processors.

2. The image processing apparatus according to claim 1, further comprising an image compression processing unit connected to the last-stage one of the plurality of the image processors to compress, for each compression unit, the image data of each block line input from the last-stage image processor.

3. The image processing apparatus according to claim 2, wherein the margin storing buffer has a capacity equal to at least the total of the image data of the margin portions used in the plurality of the image processors.

4. The image processing apparatus according to claim 2, further comprising a rearrangement unit in which the compressed image data for each compression unit obtained by the compression process for each compression unit in the image compression processing unit is rearranged to be written in the frame memory row by row.

5. The image processing apparatus according to claim 2, wherein the first number of pixels is equal to the number of pixels of the compression unit along the columns.

6. The image processing apparatus according to claim 2, wherein the first number of pixels is equal to an integer multiple of the number of pixels of the compression unit along the columns, and the first-stage one of the plurality of the image processors reads the image data of the block line from the frame memory in such a manner that the image data corresponding to the compression unit is input to the first-stage image processor column by column.

7. The image processing apparatus according to claim 2, wherein the image compression processing unit executes the JPEG compression process.

8. An image processing apparatus which executes a plurality of image processing operations on an input image data picked up and stored in a frame memory, comprising:
a plurality of image processors which read the input image data from the frame memory for each image data of a plurality of block lines each having a first number of pixels along the columns and a second number of pixels along the rows, and sequentially executing at least one of a spatial filter process and a distortion correction process on the image data of the block lines; and
a margin storing buffer which, among the image data of the present block line input to each of the plurality of the image processors, stores the image data of the margin portion used also in the image processing of the image data of the next block line,
wherein each of the plurality of the image processors, at the time of image processing on the image data of the next block line, performs the image processing on an image data including the image data of the present block line and the image data of the margin portion, and
wherein only one margin storing buffer is shared by the plurality of the image processors.

9. The image processing apparatus according to claim 8, wherein at the time of reading the input image data for each image data of the plurality of the block lines from the frame memory, the plurality of the image processors read, column by column, the image data of a plurality of division block lines into which the image data of the plurality of the block lines is divided along the rows, and the image data of the division block lines are sequentially processed,
the margin storing buffer stores, among the image data of the present division block line input to each of the plurality of the image processors, the image data of the margin portion along the columns used also in the image processing on the image data of the next division block line, and
each of the plurality of the image processors, at the time of image processing on the image data of the next division block line, executes the image processing operation on a combination of the image data of the present division block line and the image data of the margin portion.

10. The image processing apparatus according to claim 9, further comprising an image compression processing unit connected to the last-stage one of the plurality of the image processors to compress, for each compression unit, the image data on each division block line input from the last-stage image processor.

11. The image processing apparatus according to claim 10, further comprising a rearrangement unit in which the compressed image data for each compression unit obtained from the image compression processing unit are rearranged in such a manner to be written in the frame memory row by row.

12. The image processing apparatus according to claim 11, wherein the image compression processing unit adds an identification data to the compressed image data each time the image data of the compression unit is compressed, and the rearrangement unit rearranges the compressed image data for each compression unit by generating a write address to write the compressed image data for each compression unit in the frame memory row by row, by counting the number of the identification data.

13. The image processing apparatus according to claim 11, wherein the image data of each of the block lines is further divided into a plurality of areas along the columns, and the rearrangement unit rearranges the image data for each of the areas into which the image data is divided along the columns.

14. The image processing apparatus according to claim 13, wherein the margin storing buffer has a capacity equal to at least the total of the image data of the margin portions used in the plurality of the image processors.

15. The image processing apparatus according to claim 10, wherein the first number of pixels is equal to the number of pixels of the compression unit along the columns.

16. The image processing apparatus according to claim 10, wherein the first number of pixels is equal to an integer multiple of the number of pixels of the compression unit along the columns, and the first-stage one of the plurality of the image processors reads the image data of the division block line from the frame memory in such a manner that the image data corresponding to the compression unit is input to the first-stage image processor column by column.

17. The image processing apparatus according to claim 10, wherein the image compression processing unit executes the JPEG compression process.

18. The image processing apparatus according to claim 8, wherein the margin storing buffer has a capacity equal to at least the total of the image data of the margin portions used in the plurality of the image processors.

19. The image processing apparatus according to claim 8, further comprising an image compression processing unit connected to the last-stage one of the plurality of the image processors to compress, for each compression unit, the image data of each block line input from the last-stage image processor.

20. An image processing apparatus which executes a plurality of image processing operations on the input image data picked up and stored in a frame memory, comprising:
a plurality of image processors to which the image data of a plurality of block lines each having a first number of pixels along the columns and a second number of pixels along the rows are sequentially input as the input image data, and in which the image processing is executed on the image data of the block lines;

a margin storing buffer which, among the image data of the present block line input to each of the plurality of the image processors, stores the image data of the margin portion used also in the image processing on the image data of the next block line;

a setting unit which sets an operation mode indicating a particular one of the plurality of the image processors to be used and the contents of the image processing in the image processor used; and a control unit which selects an image processor to be used from the plurality of the image processors in accordance with the operation mode set by the setting unit and selects the method of storing the image data of the margin portion in the margin storing buffer in accordance with the total value of the image data of the margin portion determined in accordance with a combination of the image processors selected in accordance with the operation mode, wherein each of the plurality of the image processors, at the time of image processing on the image data of the next block line, executes the image processing on a combination of the image data of the present block line and the image data of the margin portion.

21. The image processing apparatus according to claim 20, wherein the single margin storing buffer is shared by the plurality of the image processors.

22. The image processing apparatus according to claim 21, wherein the margin storing buffer has a capacity corresponding to the maximum value of the total value of the image data of the margin portion determined in accordance with a combination of the image processors adapted to be selected in accordance with the operation mode.

23. The image processing apparatus according to claim 21, wherein in the case where the total value of the image data of the margin portion determined by the combination of the image processors selected in accordance with the operation mode exceeds a capacity of the margin storing buffer, the input image data are input to the plurality of the image processors for each of the division block lines constituting a plurality of areas into which the image data of the plurality of the block lines is divided along the rows.

24. The image processing apparatus according to claim 21, wherein in the case where the total value of the image data of the margin portion determined by the combination of the image processors selected in accordance with the operation mode exceeds a capacity of the margin storing buffer, the excess of the image data exceeding the capacity of the margin storing buffer is input to the plurality of the image processors in an overlapped fashion from the block line preceding to the present block line.

25. The image processing apparatus according to claim 20, wherein a plurality of the margin storing buffers are provided corresponding to the plurality of the image processors, the apparatus further comprising a switch which switches the connection between the plurality of the image processors and the plurality of the margin storing buffers.

26. An imaging apparatus comprising:

an imaging unit which picks up an image of an object and obtains an image data;

a frame memory which stores the image data obtained by the imaging unit;

a plurality of image processors to which the image data of a plurality of block lines each having a first number of pixels along the columns and a second number of pixels along the rows are sequentially input from the frame memory, and which sequentially execute the image processing on the image data of the block lines;

a margin storing buffer which, among the image data of the present block line input to each of the plurality of the image processors, stores the image data of the margin portion used also in the image processing on the image data of the next block line;

a setting unit which sets an operation mode indicating a particular one of the plurality of the image processors to be used and the contents of the image processing in the image processor used; and a control unit which selects an image processor to be used from the plurality of the image processors in accordance with the operation mode set by the setting unit and also selects the method of storing the image data of the margin portion in the margin storing buffer in accordance with the total value of the image data of the margin portion determined in accordance with a combination of the image processors selected in accordance with the operation mode, wherein each of the plurality of the image processors executes, at the time of image processing on the image data of the next block line, the image processing on a combination of the image data of the present block line and the image data of the margin portion.

27. The imaging apparatus according to claim 26, wherein the operation mode includes a normal imaging mode, a high-sensitivity imaging mode, a reduction image recording mode and an imaging mode with the distortion correction function.

* * * * *